US009591162B2

(12) United States Patent
Sahara

(10) Patent No.: US 9,591,162 B2
(45) Date of Patent: Mar. 7, 2017

(54) IMAGE READING APPARATUS AND NON-TRANSITORY COMPUTER READABLE MEDIUM

(71) Applicant: BROTHER KOGYO KABUSHIKI KAISHA, Nagoya-shi, Aichi-ken (JP)

(72) Inventor: Shinya Sahara, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/865,116

(22) Filed: Sep. 25, 2015

(65) Prior Publication Data

US 2016/0094749 A1 Mar. 31, 2016

(30) Foreign Application Priority Data

Sep. 29, 2014 (JP) ................................. 2014-198454

(51) Int. Cl.
*H04N 1/04* (2006.01)
*H04N 1/00* (2006.01)
*H04N 1/12* (2006.01)

(52) U.S. Cl.
CPC ....... *H04N 1/00909* (2013.01); *H04N 1/0032* (2013.01); *H04N 1/0464* (2013.01); *H04N 1/1215* (2013.01); *H04N 2201/0094* (2013.01); *H04N 2201/0416* (2013.01)

(58) Field of Classification Search
CPC ............. H04N 1/00909; H04N 1/0032; H04N 1/0464; H04N 1/1215
USPC ................. 358/474, 498, 497, 496
See application file for complete search history.

(56) References Cited

U.S. PATENT DOCUMENTS

| 6,563,938 B1* | 5/2003 | Harada | G06K 9/32 358/461 |
| 8,320,029 B2* | 11/2012 | Kamei | H04N 1/00002 358/483 |
| 9,001,398 B2 | 4/2015 | Mayama | |

FOREIGN PATENT DOCUMENTS

| JP | 2002-185706 A | 6/2002 |
| JP | 2003-207857 A | 7/2003 |
| JP | 2006-060493 A | 3/2006 |
| JP | 2007-181062 A | 7/2007 |

OTHER PUBLICATIONS

US Office Action dated Oct. 1, 2015 from related U.S. Appl. No. 14/670,997.
U.S. Appl. No. 14/670,997, filed Mar. 27, 2015.

* cited by examiner

*Primary Examiner* — Houshang Safaipour
(74) *Attorney, Agent, or Firm* — Scully, Scott, Murphy & Presser, P.C.

(57) ABSTRACT

An image reading apparatus includes a document feeder; a platen; an image reader configured to read the document, fed by the document feeder, through the platen; a memory; and a controller. The controller causes the image reader to read a reference plate at a predetermined reading position to generate read data, and detecting whether the read data has an abnormality; when the read data has the abnormality, stores a detection position; sets a reading position of the image reader in the sub-scanning direction to a set position spaced by a predetermined range or more from the detection position; when instruction to start reading is received, moves the image reader under standby at a standby position to arrange the image reader at the set position; and reads the document, fed by the document feeder, by the image reader.

20 Claims, 11 Drawing Sheets

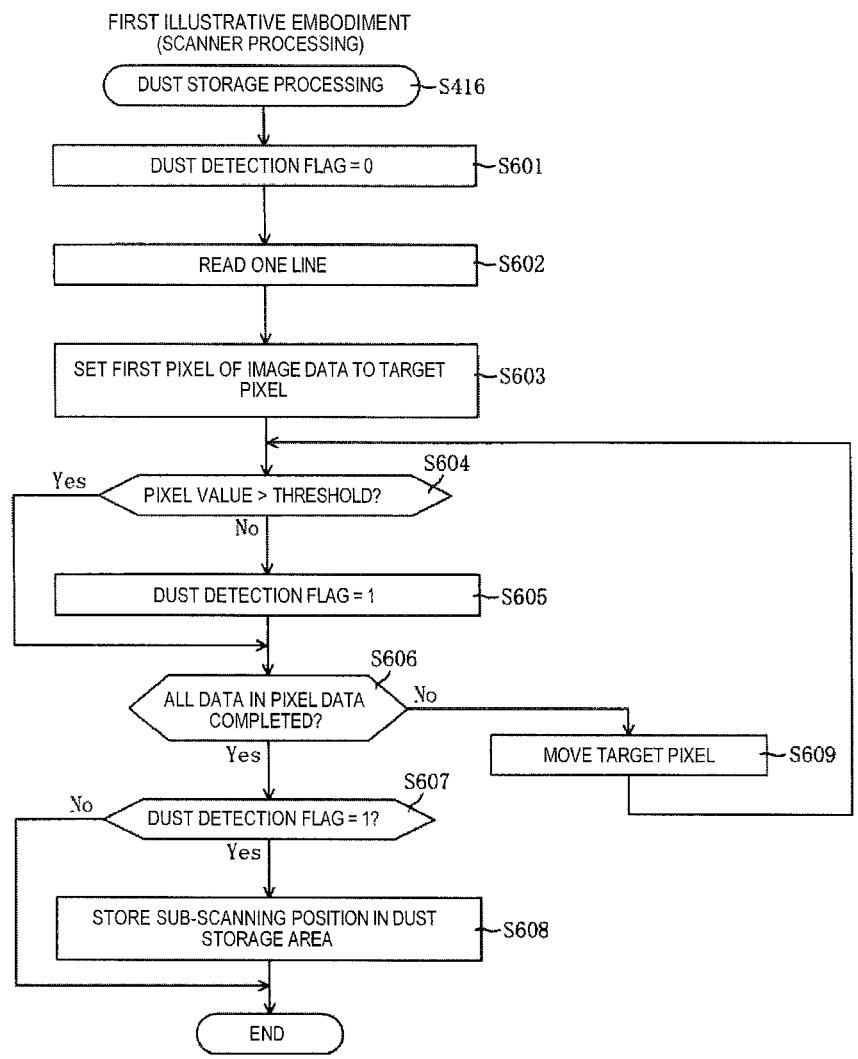

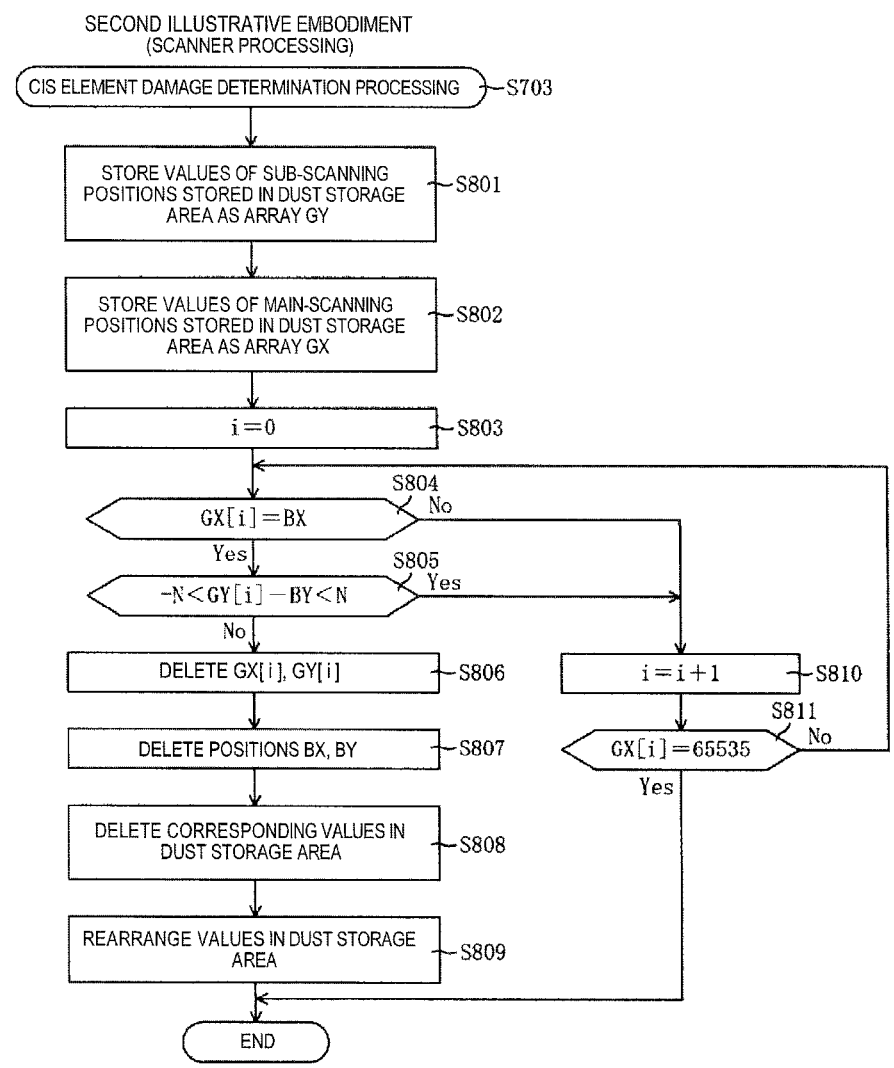

IMAGE READING APPARATUS AND NON-TRANSITORY COMPUTER READABLE MEDIUM

CROSS-REFERENCE TO RELATED APPLICATION

This application claims priority from Japanese Patent Application No. 2014-198454 filed on Sep. 29, 2014, the content of which is incorporated herein by reference in its entirety.

FIELD OF DISCLOSURE

The disclosure relates to an image reading apparatus and non-transitory computer readable medium.

BACKGROUND

A known scanner includes an automatic document feeder (hereinafter, referred to as the "ADF"). The scanner is configured to read a document using a reader fixed at a predetermined reading position, while feeding the document using the ADF. The scanner includes a transparent platen between the reader configured to read documents and a document fed by the ADF. Accordingly, the reader reads a document, via the platen. When dust adheres to the platen, the reader continuous reads the dust on the platen while the reader reads the document fed by the ADF. Therefore, an output image has a black streak extending in a document feeding direction.

To prevent or reduce such problem, the known scanner is configured to detect dust adhering to the platen before the scanner starts reading a document. The reader, e.g., a line sensor, is placed at a position avoiding a dust detected position.

SUMMARY

In the known scanner, when dust is detected after the dust detection is performed at a reading position, the reader is moved to a next reading position. The movement of the reader is repeated until dust is not detected. Accordingly, a reading start may be delayed. Regarding the above problem, it is considered to store the detected dust position and to set a reading position of the image reader while avoiding the stored dust position when reading a next document.

However, the image reader is normally moved to the standby position after the document reading is completed. Therefore, when moving the image reader from the standby position to the reading position set to avoid the stored dust position as the reading of a next document starts, a movement error is likely to occur and the image reader may unintentionally read the dust at the stored position.

An aspect of the present disclosure provides the following configurations.

An image reading apparatus comprises: a document feeder configured to feed a document in a feeding direction; a platen; an image reader configured to read the document, fed by the document feeder, through the platen; a drive unit configured to move a reading position of the image reader in a sub-scanning direction parallel to the feeding direction; a memory, and a controller. The controller is configured to execute: a first detection process of causing the image reader to read a reference plate at a predetermined reading position to generate read data, and detecting whether the read data has an abnormality; a position storage process of, when it is detected in the first detecting process that the read data has the abnormality, storing, in the memory, a detection position where the image reader reads the read data in the sub-scanning direction; a reading position setting process of setting a reading position of the image reader in the sub-scanning direction to a set position spaced by a predetermined range or more from the detection position stored in the memory, the set position being located within a range settable as the reading position; an instruction receiving process of receiving an instruction to start document reading; a movement process of, when the instruction is received in the instruction receiving process, moving, by the drive unit, the image reader under standby at a standby position to arrange the image reader at the set position set according to the reading position setting process; and a first reading process of reading the document, fed by the document feeder, by the image reader which is moved according to the movement process.

A non-transitory computer readable recording medium stores an image reading program to be executed by a controller of an image reading apparatus including a document feeder configured to feed a document in a feeding direction; a platen; an image reader configured to read the document fed by the document feeder through the platen; a drive unit configured to move a reading position of the image reader in a sub-scanning direction parallel to the feeding direction; a memory, and the controller. The image reading program when executed by the controller causes the controller to execute: a first detection process of causing the image reader to read a reference plate at a predetermined reading position to generate read data, and detecting whether the read data has an abnormality; a position storage process of, when it is detected in the first detecting process that the read data has the abnormality, storing, in the memory, a detection position where the image reader reads the read data in the sub-scanning direction; a reading position setting process of setting a reading position of the image reader in the sub-scanning direction to a set position spaced by a predetermined range or more from the detection position stored in the memory, the set position being located within a range settable as the reading position; an instruction receiving process of receiving an instruction to start document reading; a movement process of, when the instruction is received in the instruction receiving process, moving, by the drive unit, the image reader under standby at a standby position to arrange the image reader at the set position set by the reading position setting process; and a first reading process of reading the document, fed by the document feeder, by the image reader which is moved according to the movement process.

An image reading apparatus comprises: a document feeder configured to feed a document in a feeding direction; a platen; an image reader configured to read the document fed by the document feeder through the platen; a drive unit configured to move a reading position of the image reader in a sub-scanning direction parallel to the feeding direction; a memory; and a controller. The controller is configured to execute: a determination process of reading a reference plate at a predetermined reading position by the image reader to obtain read data, and determining whether a pixel value of the read data exceeds a threshold; a position storage process of, when it is determined in the first determination process that the pixel value of the read data does not exceed the threshold, storing, in the memory, a position of the image reader in the sub-scanning direction where the image reader obtains the read data; a reading position setting process of setting a reading position of the image reader in the sub-scanning direction to a set position spaced by a predetermined range or more from the position stored in the memory, the set position being located within a range settable as the reading position; an instruction receiving process of receiving an instruction to start document reading; a movement process of, when the instruction is received according to the instruction receiving process, moving the image reader under standby at a standby position by the drive unit and arranging the image reader at the set position set according to the reading position setting process; and a first reading process of reading the document, fed by the document feeder, by the image reader moved according to the movement process.

BRIEF DESCRIPTION OF DRAWINGS

FIG. 6 is a flowchart depicting dust detection processing.

FIG. 8 is a flowchart depicting CIS element damage determination processing.

DETAILED DESCRIPTION

Figure 1A:
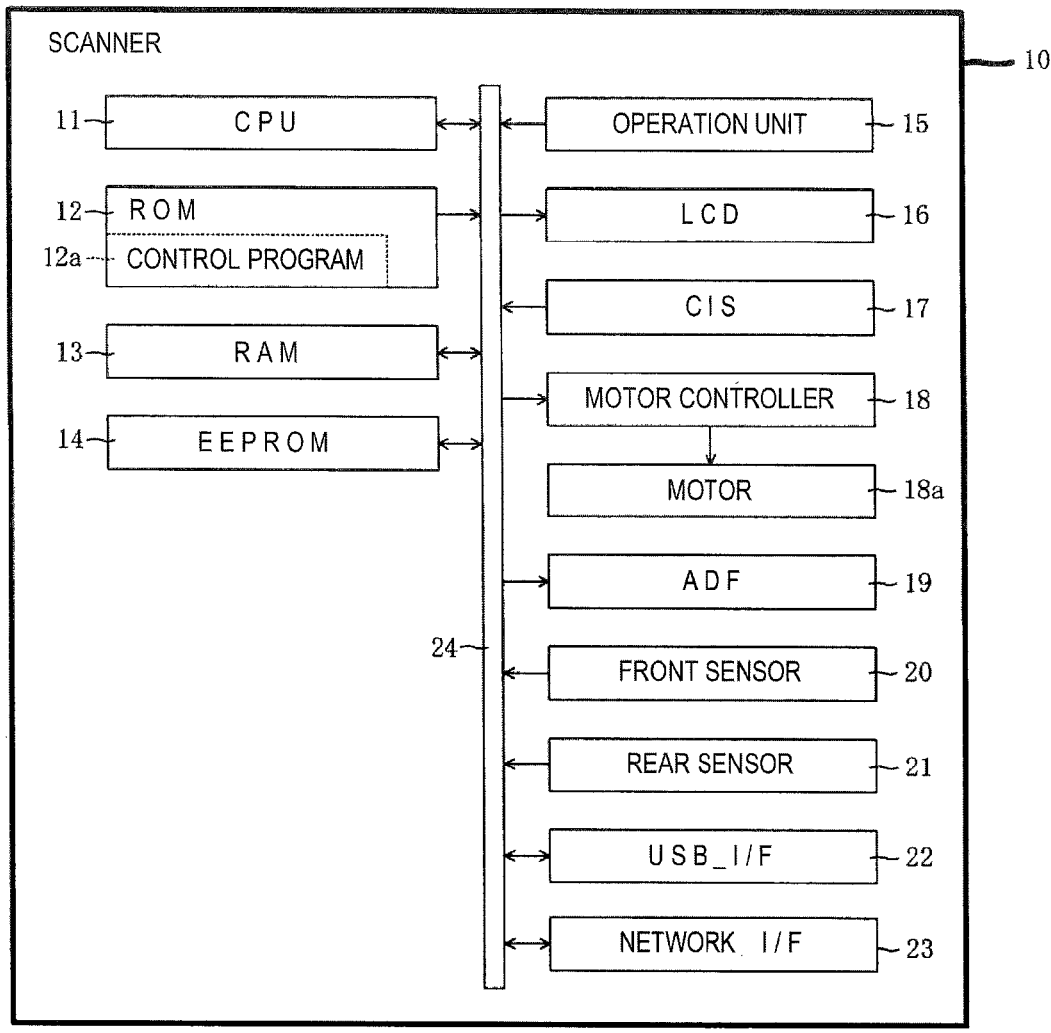
FIG. 1A is a block diagram depicting an electrical configuration of a scanner.

Illustrative embodiments will be described with reference to the accompanying drawings. First, a first illustrative embodiment will be described referring to FIGS. 1A-4B. FIG. 1A is a block diagram depicting electrical configuration of an image reading apparatus, e.g., a scanner 10, according to an illustrative embodiment. As will be described in detail, the scanner 10 according to the illustrative embodiment may be configured to preventing or reducing occurrence of an abnormal image due to, for example, dust.

The scanner 10 mainly includes a central processing unit (CPU) 11, a read only memory (ROM) 12, a random-access memory (RAM) 13, an electrically erasable programmable read only memory (EEPROM) 14, a control panel 15, a liquid crystal display (LCD) 16, a contact image sensor (CIS) 17, a motor controller 18, an automatic document feeder (ADF) 19, a front sensor 20, a rear sensor 21, a universal serial bus (USB) interface 22, and a network interface 23. These devices 11-23 are connected to each other, via a bus line 24.

The CPU 11 controls devices or components of the scanner 10, based on fixed values and programs stored in the ROM 12 and data stored in the RAM 13. The ROM 12 is a read-only memory.

The ROM 12 stores therein control programs 12a for controlling operations of the scanner 10, and constants and tables that are referred to when the control programs 12a are performed. The CPU 11 performs processing depicted in flowcharts of FIGS. 4A, 5 and 6 in accordance with the control programs 12a.

The RAM 13 is a rewritable volatile memory configured to temporarily store information necessary for processing of the CPU 11. The EEPROM 14 is a rewritable nonvolatile memory that holds its data when the power turns off. The EEPROM 14 includes a dust storage area 14a (described below).

The control panel 15 permits instructions and various settings to be input to the scanner 10. The control panel 15 includes a touch panel provided on the LCD 16, and mechanical keys. The LCD 16 is a liquid crystal display configured to display various screens.

The CIS 17 is a contact image sensor and a reader configured to read a document. The CIS 17 includes a linear image sensor including a plurality of light receiving elements linearly arranged in a main-scanning direction, a light source including three colors of red, green and blue light-emitting diodes, and a rod lens array for imaging light reflected off a document in the respective light receiving elements of the image sensor.

The main-scanning direction is parallel to a plane of platen glasses 44 and 45 (refer to FIG. 2) and perpendicular to a direction in which the CIS 17 is moved. The main-scanning direction is perpendicular to a document feeding direction in which a document is fed by the ADF 19 over the platen glasses 44 and 45.

The motor controller 18 is configured to control driving of the motor 18a, in response to the control by the CPU 11. The motor 18a is a stepping motor. The motor 18a is a driving source for moving the CIS 17 in a sub-scanning direction. The sub-scanning direction is parallel to a document feeding direction in which a document is fed over the platen glasses 44 and 45 by the ADF 19. The sub-scanning direction is the direction indicated by an arrow F or an arrow B (refer to FIG. 2).

More specifically, the motor controller 18 is configured to control a rotating speed, a stop position and the like of the motor 18a, in response to the control by the CPU 11. The CPU 11 is configured to acquire a current position of the CIS 17, to set the current position in the RAM 13 and to output an acceleration or deceleration instruction to the motor controller 18 in accordance with the current position of the CIS 17, in interrupt processing (hereinafter, referred to as 'line end interrupt') that is to executed whenever the CIS 17 reads a predetermined number of lines.

The motor controller 18 is configured to control the driving of the motor 18a in accordance with a drive table (not shown) stored in the EEPROM 14. The drive table is a table in which driving conditions of the motor 18a are defined. In the drive table, a driving current value, an excitation method, a rotating speed and the like are defined as the motor driving conditions. The rotating speed of the motor 18a and a moving amount of the motor 18a per one step are controlled in accordance with the driving conditions defined in the drive table.

That is, since the moving amount of the CIS 17 per one step is controlled in accordance with the drive table, it can be said that the drive table is a table for defining a movement resolution of the CIS 17. The movement resolution of the CIS 17 is a number of steps per a unit distance. In this illustrative embodiment, a unit of the movement resolution is dpi.

The drive table is prepared for each utility. As the utility, a case where the CIS 17 is moved from the standby position to the reading position, a case where a boundary detection tape 70 (refer to FIG. 2) is detected, and the like may be exemplified.

Figure 2:
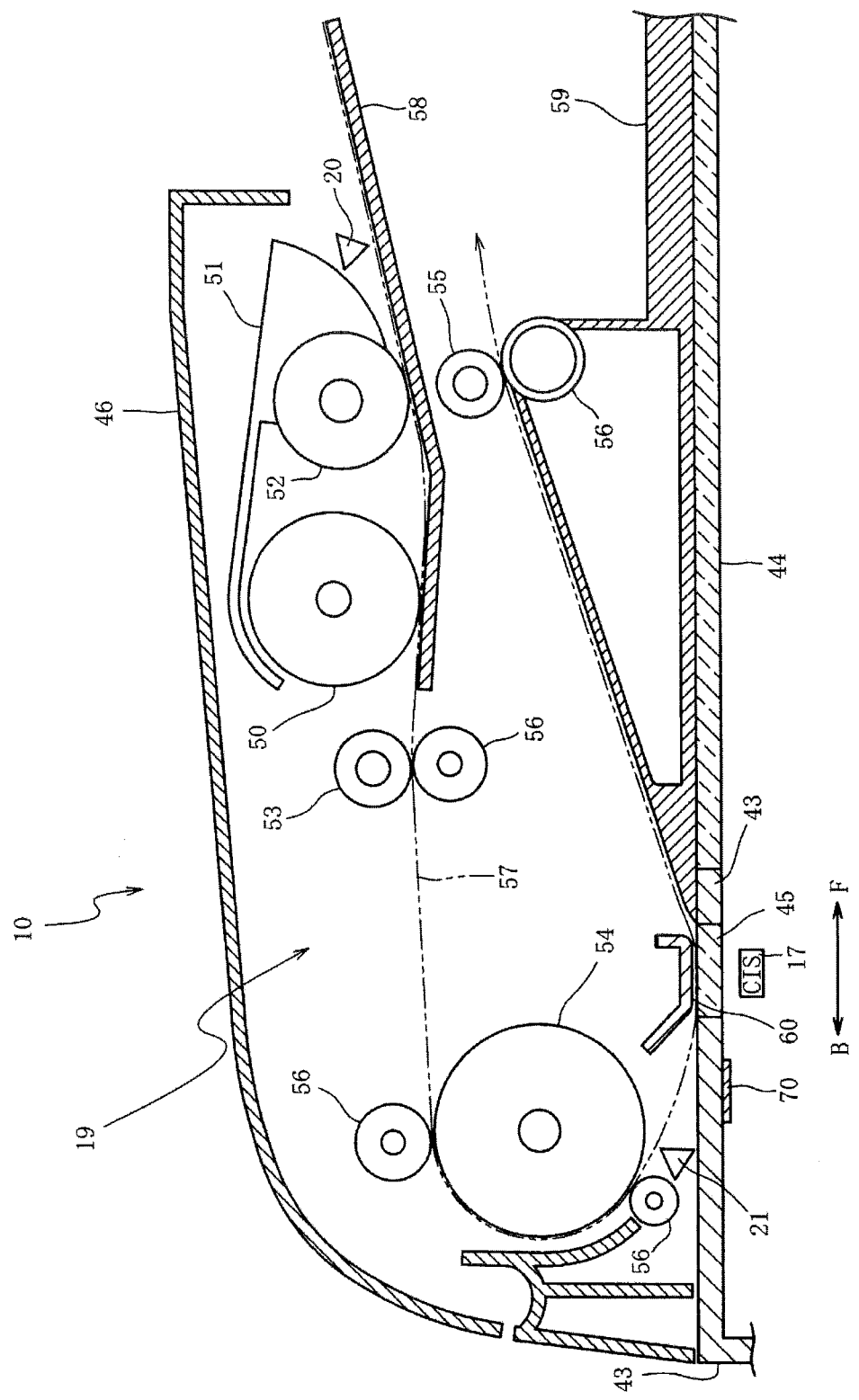
FIG. 2 is a pictorial view illustrating a part of the scanner.

The ADF 19 is configured to feed a document set in a document tray 58 (refer to FIG. 2) to a reading position by the CIS 17 along a feeding path 57 (refer to FIG. 2). The ADF 19 is also configured to feed the document that has been read by the CIS 17 to a discharge tray 59.

The front sensor 20 is configured to detect a document set in the document tray 58. The rear sensor 21 is configured to detect the document fed by the ADF 19. Each of the front sensor 20 and the rear sensor 21 includes a photo-sensor.

Each of the front sensor 20 and the rear sensor 21 is configured to output a respective signal whose output level is different, in response to the presence or absence of a document at their respective positions. Based on the signal output from the front sensor 20 or the rear sensor 21, the scanner 10 is configured to detect the presence or absence of a document set in the document tray 58, and the presence or absence of a document at the position of the rear sensor 21.

The USB interface 23 is a well-known device for communicably connecting, via a USB plug, other devices, e.g., a storage medium such as a USB memory, a personal computer, and hard disk. The network interface 24 is an interface to allow the scanner 10 to connect to, network (not depicted), e.g., local area network (LAN) and the Internet.

Figure 1B:
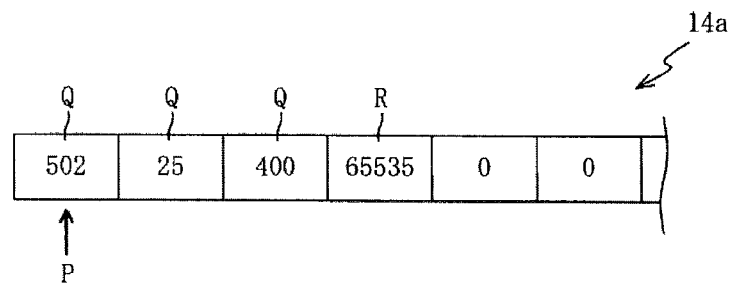
FIG. 1B is a pictorial view for illustrating a dust storage area.

FIG. 1B is a diagram depicting a dust storage area 14a provided in the EEPROM 14. When a possible object that causes an abnormal image is detected, e.g., there is a dust on the second platen glass 45, a position where such a possible object, e.g., dust, is detected (hereinafter, referred to as a "dust detected position Q") is stored in the dust storage area 14a. In the illustrative embodiment, a dust detected position Q in the sub-scanning direction (hereinafter, referred to as a "sub-scanning position") is stored in the dust storage area 14a.

A dust detected position Q is sequentially stored from a first area P of the dust storage area 14a. An end designating value R is stored in the dust storage area 14a. The end designating value R represents no more dust detected position Q is stored or exists in the dust storage area 14a. For the end designating value R, a value that cannot be taken as a dust detected position Q, e.g., "65535," is set in this illustrative embodiment. The end designating value R is stored in the first area P in an initial state of the dust storage area 14a. Every time such a possibility that causes an abnormal image is detected, a dust detected position Q is written over an area of the dust storage area 14a where the end designating value R is stored. The end designating value R is stored in an immediately following area in the dust storage area 14a.

FIG. 2 is a sectional view of a portion the scanner 10. The scanner 10 includes a casing 43 having a generally box shape. The first platen glass 44 and the second platen glass 45 are arranged at an upper portion of the casing 43.

A document cover 46 is pivotally connected to the casing 43. The document cover 46 is configured to pivotally move between a closed position in which each of the platen glasses 44 and 45 are closed, and an open position in which each of the platen glasses 44 and 45 is open. The document cover 46 is provided with the ADF 19, the document tray 58, and the discharge tray 59.

Disposed in an interior of the ADF 19 are a separation roller 50, a suction roller 52 rotatably disposed at an end portion of an arm 51 whose opposite end portion is supported by a shaft of the separation roller 50, a plurality of feeding rollers 53 and 54, a discharge roller 55, and a plurality of follower rollers 56 pressed against the rollers 53, 54, and 55. A document is fed by those rollers along a feeding path 57. The document passes through a position where the CIS 17 reads the document, and is discharged onto the discharge tray 59. The reading drive portion 18 drives the separation roller 50, the suction roller 52, the plurality of feeding rollers 53 and 54, and the discharge roller 55.

The CIS 17 is accommodated in an interior of the casing 43 of the scanner 10. When the CIS 17 reads a document fed by the ADF 19, the CIS 17 stops at a position directly below the second platen glass 45. With the position as a reading position, the CIS 17 reads a document via the second platen glass 45 while colors of the light source are sequentially changed. When the CIS 17 reads a document placed on the first platen glass 44, the CIS 17 reads the document while the CIS 17 is moved in the sub-scanning direction (e.g., direction of the arrow F or direction of the arrow B) at a constant speed using the reading drive portion 18, and colors of the light source are sequentially changed.

A white reference plate 60 is disposed across the second platen glass 45 from the CIS 17. The CIS 17 is configured to read the white reference plate 60, via the second platen glass 45. In the illustrative embodiment, the CIS 17 is configured to read the reference plate 60 after document reading, to detect such a possible object that causes an abnormal image, e.g., dust on the second platen glass 45.

The front sensor 20 functions as a sensor to detect the absence or presence of a document set in the document tray 58. The rear sensor 21 functions as a sensor to determine a start time of document reading by the CIS 17. More specifically, the scanner 10 is configured to start reading a document with the CIS 17 as the document is fed by a predetermined feeding amount after the rear sensor 21 detects a leading end of the document.

The rear sensor 21 also functions as a sensor to determine an end time of document reading by the CIS 17. More specifically, the scanner 10 is configured to finish reading a document with the CIS 17 as the document is fed by a predetermined feeding amount after the rear sensor 21 stops detecting the document.

FIG. 3A is a flowchart depicting ADF reading processing that the CPU 11 performs in accordance with the control programs 12a. In this processing, a document is read while the document is being fed using the ADF 19. The CPU 11 waits for the reception of an instruction of document reading using the ADF 19 (S301: No).

A surface of the housing 43 facing the CIS 17 is provided with a boundary detection tape 70 at a more upstream side (the arrow B direction) than the second platen glass 45 with respect to the sub-scanning direction. The boundary detection tape 70 is used to detect a reference position for arranging the CIS 17 at the standby position. The CPU 11 is configured to determine a position of the CIS 17 based on the reference position (origin) detected by the boundary detection tape 70.

Figure 3:
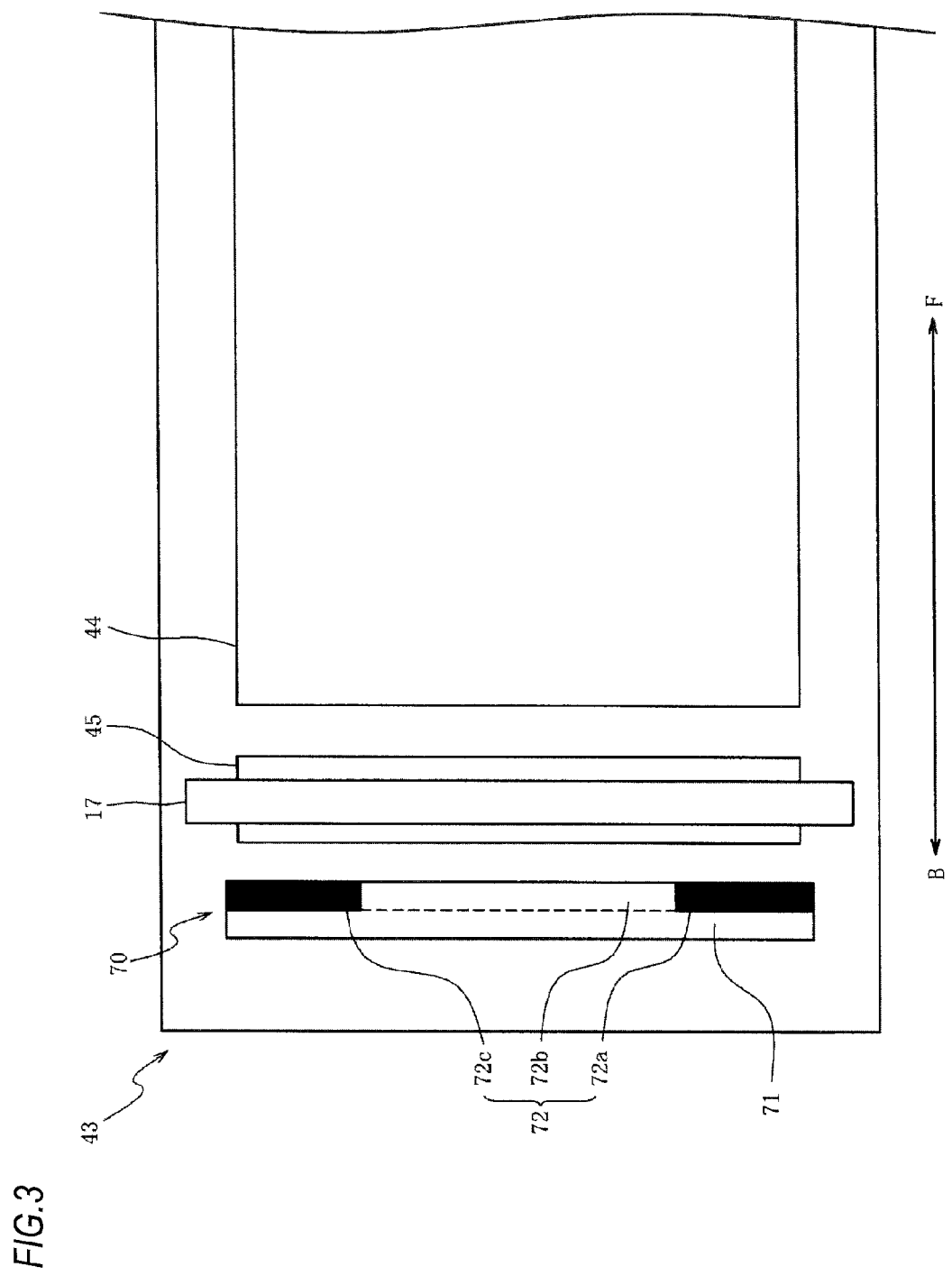
FIG. 3 is a pictorial view depicting a configuration of a surface of a housing of the scanner facing a CIS, as seen from the CIS.

FIG. 3 is a pictorial view illustrating a configuration of the surface of the housing 43 facing the CIS 17, as seen from the CIS 17. As shown in FIG. 3, the boundary detection tape 70 is provided on the surface of the housing 43 facing the CIS 17 in the vicinity of the more upstream side than the second platen glass 45 with respect to the sub-scanning direction, and is configured to have a plate shape longer than the second platen glass 45 and the first platen glass 44 in the main-scanning direction by several millimeters.

The boundary detection tape 70 is bisected in the sub-scanning direction, and an upstream side thereof is a white reference part 71, and a downstream side thereof is a resolution measuring reference part 72. The white reference part 71 is a white area of which an entire area has a uniform density. On the other hand, the resolution measuring reference part 72 is divided into three areas, and both end portions in the main-scanning direction are provided with black areas 72a, 72c, and a white area 72b is provided between the black areas 72a, 72c.

The black areas 72a, 72c and the white area 72b adjoin each other in the main-scanning direction, i.e., in the direction perpendicular to the arrow F or arrow B direction, and the adjoining boundary is used as a reference of a reading range of the position of the CIS 17 in the main-scanning direction. In the meantime, the boundary between the black areas 72a, 72c and the white reference part 71 becomes the reference position for arranging the CIS 17 at the standby position. A position spaced from the boundary between the black areas 72a, 72c and the white reference part 71 by a predetermined distance in the upstream side (the arrow B direction) of the sub-scanning direction is the standby position of the CIS 17.

Figure 4A:
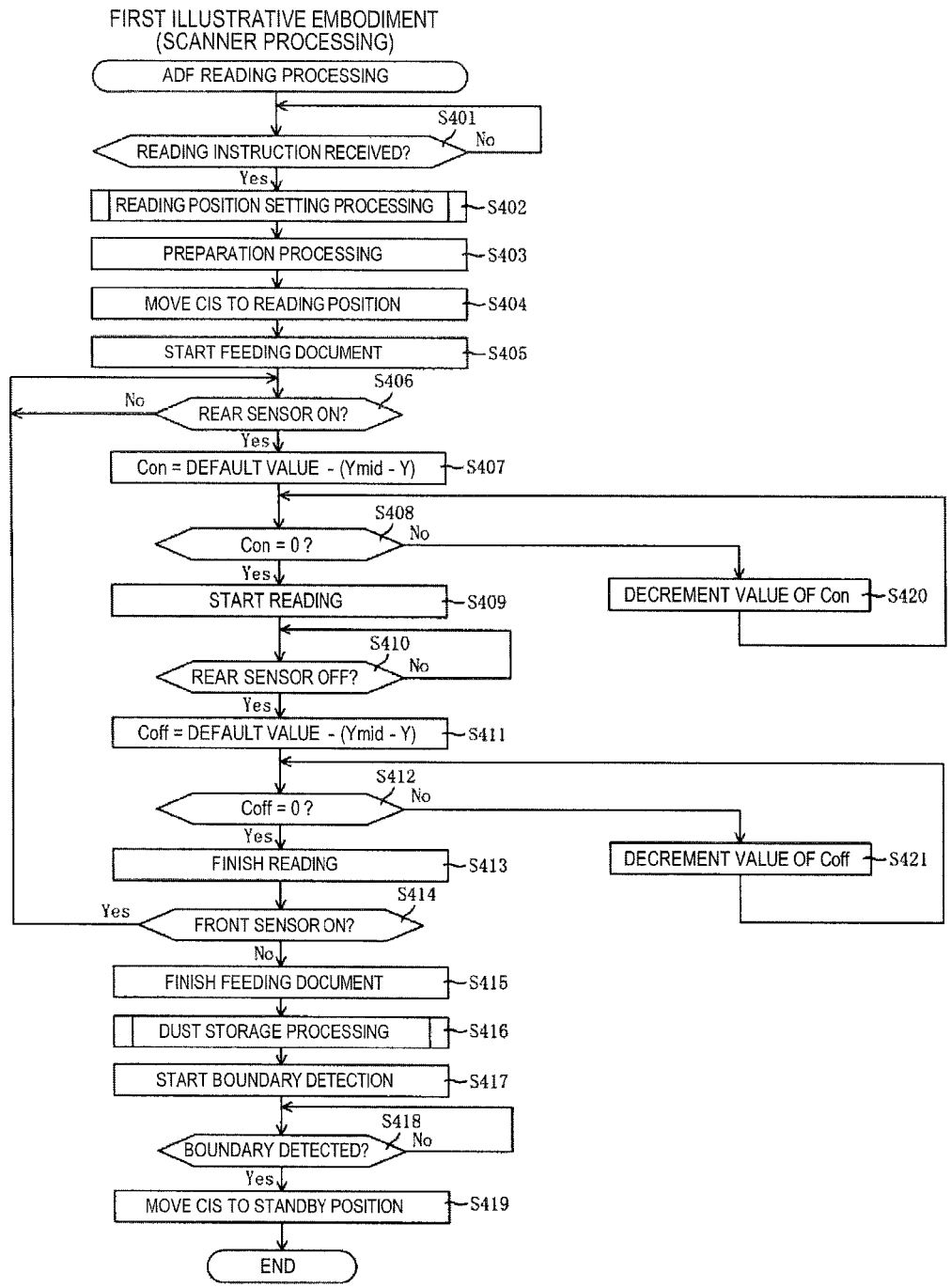
FIG. 4A is a flowchart depicting ADF reading processing.

FIG. 4A is a flowchart depicting ADF reading processing that the CPU 11 performs in accordance with the control programs 12a. In this processing, a document is read while the document is being fed using the ADF 19. The CPU 11 waits for the reception of an instruction of document reading using the ADF 19 (S401: No).

When the CPU 11 receives an instruction of document reading using the ADF 19 (S401: Yes), the CPU 11 performs reading position setting processing (S402). In the reading position setting processing (S402), a reading position of the CIS 17 in sub-scanning direction is set. As will be described in detail referring to FIG. 5, in the reading position setting processing (S402), the reading position is set to such a position avoiding a position in which an abnormal image is likely to occur.

The CPU 11 performs preparation processing, e.g., light intensity adjustments and shading compensation (S403). The CPU 11 controls the motor controller 18 to move the CIS 17 in the sub-scanning direction to the reading position set in the reading position setting processing (S402) (S404). The CPU 11 starts feeding a document set on the document tray 58 using the ADF 19 (S405).

The CPU 11 waits for an ON signal to be input from the rear sensor 21 (S406: No). The rear sensor 21 outputs an OFF signal when the rear sensor 21 does not detect a document and an ON signal when the rear sensor 21 detects a document. In other words, the CPU 11 waits for the leading end of the document fed by the ADF 19 to reach a detection position by the rear sensor 21.

When the CPU 11 determines that an ON signal is input from the rear sensor 21 (S406: Yes), the CPU 11 makes a setting of a reading start counter Con (S407). The reading start counter Con is for counting the number of feeding steps required by a motor (not shown) for driving the feeding rollers 54 and 54 to feed a document until the CIS 17 starts reading the document after the rear sensor 21 detects the leading end of the document. The number of such feeding steps is hereinafter, referred to as "the number of start waiting steps." More specifically, in S307, the CPU 11 sets a value obtained by subtracting "(Ymid−Y)" from a default value of the reading start counter Con, to the reading start counter Con.

Figure 4B:
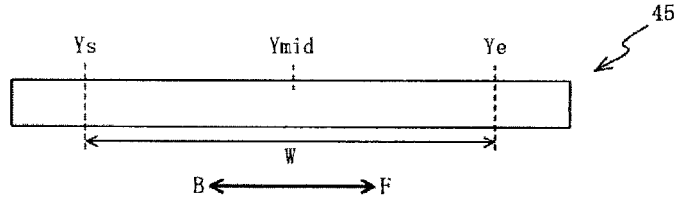
FIG. 4B is a pictorial view for illustrating a range W.

As depicted in FIG. 4B, "Ymid" is a central position of a range W in the sub-scanning direction. The range W is a predetermined portion or range of the second platen glass 45 in the sub-scanning direction (e.g., direction of the arrow F or direction of the arrow B) in which image quality is not impaired. In other words, in the range W, "Ymid" is the midpoint in the sub-scanning direction between a start point "Ys" and an end point "Ye". As the range W, a guarantee range of Modulation Transfer Function (MTF) values determined by the manufacturer of, for example, the scanner 10, e.g., a reading quality guarantee range, may be employed.

A reading position "Y" is a reading position in the sub-scanning direction set in the reading position setting processing (S402). The default reading position of the CIS 17 is "Ymid". In other words, the number of start waiting steps to be counted with the value of the reading start counter Con set in S407 represents a corrected period that is obtained by correcting the number of default start waiting steps in accordance with the reading position "Y" set in the reading position setting processing (S402). Therefore, document reading may be started at a right or proper timing regardless of a value of the reading position "Y" in a structure in which a value of the reading position "Y" set in the reading position setting processing (S402) is changed.

The CPU 11 determines whether a value of the reading start counter Con is "0" (S408). When the CPU 11 determines that a value of the reading start counter Con is not "0" (S408: No), the CPU 11 decrements the value of the reading start counter Con in accordance with document feeding (S418). The CPU 11 proceeds to S408. When the CPU 11 determines that a value of the reading start counter Con is "0" (S408: Yes), the CPU 11 starts reading the document with the CIS 17 (S409).

The CPU 11 waits for an OFF signal to be input from the rear sensor 21 (S410: No). In other words, the CPU 11 waits until the trailing end of the document fed by the ADF 19 comes out of or passes through the detection position by the rear sensor 21. When the CPU 11 determines that an OFF signal is input from the rear sensor 21 (S410: Yes), the CPU 11 makes a setting of a reading end counter Coff (S411). The reading end counter Coff is for counting the number of feeding steps required by the motor of the motor driver 18 to feed a document until the CIS 17 finishes reading the document after the rear sensor 21 stops detecting the document. The number of such feeding steps is hereinafter, referred to as "the number of end waiting steps."

More specifically, in S411, the CPU 11 sets a value obtained by subtracting "(Ymid−Y)" from the default value of the reading end counter Coff, to the reading end counter Coff. In other words, the number of end waiting steps to be counted with the value of the reading end counter Coff set in S411 represents a corrected period that is obtained by correcting the number of default end waiting steps in accordance with the reading position "Y" set in the reading position setting processing (S402). Therefore, document reading may be finished at a right or proper timing regardless of a value of the reading position "Y" in a structure in which a value of the reading position "Y" set in the reading position setting processing (S402) is changed.

The CPU 11 determines whether a value of the reading end counter Coff is "0" (S412). When the CPU 11 determines that a value of the reading end counter Coff is not "0" (S412: No), the CPU 11 decrements the value of the reading end counter Coff in accordance with document feeding (S419). The CPU 11 proceeds to S412. When the CPU 11 determines that a value of the reading end counter Coff is "0" (S412: Yes), the CPU 11 finishes reading the document with the CIS 17 (S413).

The CPU 11 determines whether an ON signal is input from the front sensor 20 (S414). The front sensor 20 outputs an OFF signal when the front sensor 20 does not detect a document and outputs an ON signal when the front sensor 20 detects a document. In other words, the CPU 11 determines whether a document is set in the document tray 58.

When the CPU 11 determines that an ON signal is input from the front sensor 20 (S414: Yes), e.g., a document is set in the document tray 58, the CPU 11 proceeds to S406. The CPU 11 performs processes in S406-S413, S418, and S419 for a next document. When the CPU 11 determines that an ON signal is not input from the front sensor 20, e.g., an OFF signal is input (S414: No), the CPU 11 finishes feeding the document with the ADF 19 (S415).

After S415, the CPU 11 performs dust storage processing (S416). As will be described in detail referring to FIG. 6, when such a possible object, e.g., dust, that causes an abnormal image is detected at a position on the second platen glass 45, the position (e.g., a dust detected position) is stored in the dust storage area 14a of the EEPROM 14 in the dust storage processing (S416).

After executing the dust storage processing (S416), the CPU 11 starts the detection of the boundary between the black areas 72a, 72c and the white reference part 71 of the boundary detection tape 70 by driving the motor controller 18 to move the CIS 17 (S417). Specifically, the CPU 11 drives the motor controller 18 to move the CIS 17 in the upstream side (the arrow B direction) of the sub-scanning direction and executes the reading by the CIS 17 line-by-line.

Based on the image data obtained by the reading by the CIS 17, the CPU 11 determines whether the boundary is detected, until the boundary between the black areas 72a, 72c and the white reference part 71 is detected (S418: No). When the CPU 11 determines that the boundary between the black areas 72a, 72c and the white reference part 71 is detected (S418: Yes), the CPU 11 moves the CIS 17 from the boundary detected position to a position spaced therefrom by a predetermined distance in the upstream side (the arrow B direction) of the sub-scanning direction (S419), and ends the ADF reading processing. Specifically, the CPU 11 drives the motor controller 18 to rotate the motor 18a by a number of steps corresponding to the predetermined distance in the direction of moving the CIS 17 towards the upstream side of the sub-scanning direction. As a result of the processing of S419, the movement of the CIS 17 to the standby position is completed.

Figure 5:
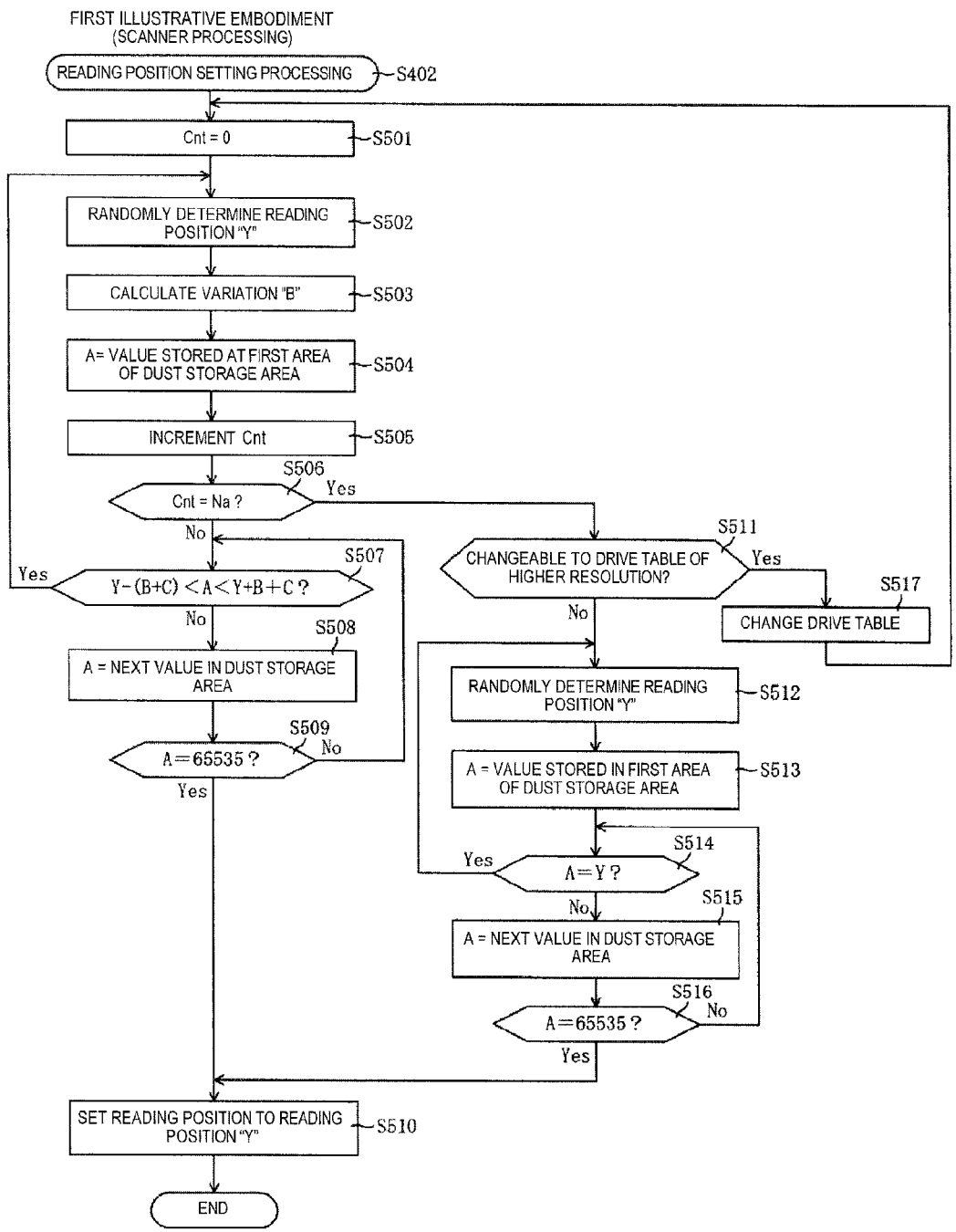
FIG. 5 is a flowchart depicting reading position setting processing.

FIG. 5 is a flowchart depicting the reading position setting processing (S402). The CPU 11 sets a value of Cnt, which is a counter of number of processing times, to zero (S501). The counter of number of processing times Cnt is a counter configured to count the number of times of randomly determining a value of the reading position "Y" in S502.

The CPU 11 randomly determines a value of the reading position "Y" (S502). At this time, the Y value is a value within the range W. The CPU 11 calculates a variation B (S503). The variation "B" is a value indicating an error of a position at which the CIS 17 actually arrives when moving the CIS 17 located at the standby position to the reading position "Y" position determined in S502. The error mainly depends on a sum of a detection error E1 of the standby position and a movement error E2 of the CIS 17. In this illustrative embodiment, the variation "B" is a sum of the detection error E1 of the standby position and the movement error E2 of the CIS 17.

The detection error E1 of the standby position is a value corresponding to a reciprocal of the reading resolution upon the boundary detection in S418. On the other hand, the movement error E2 of the CIS 17 is a value obtained by multiplying a reciprocal of the movement resolution of the CIS 17, which is defined by the drive table being currently applied, by the number of steps of the motor 18a to be driven by the motor controller 18 per one interrupt by the line end interrupt processing that is executed so as for the CPU 11 to control the motor controller 18.

For example, when the reading resolution upon the boundary detection in S418 is 600 dpi, the detection error E1 of the standby position is ($1/600$)×25.4 (mm) In the meantime, 25.4 is a value for converting an inch unit into a millimeter unit. On the other hand, when the movement resolution of the CIS 17 is 4800 dpi and the number of steps of the motor 18a per one interrupt by the line end interrupt processing is 32 steps, the movement error E2 of the CIS 17 is ($1/4800$)× 32×25.4 (mm).

The CPU 11 sets, as a variable "A", a value stored in the first area P of the dust storage area 14a (S504). In the meantime, when the dust detected position is not stored in the dust storage area 14a, i.e., when the end designating value R is stored in the first area P of the dust storage area 14a, the CPU 11 proceeds to S510. That is, the CPU 11 sets the reading position to the reading position "Y". The CPU 11 increments the counter of number of processing times Cnt (S505).

The CPU 11 determines whether the value of the counter of number of processing times Cnt is Na (S506). Na is a threshold for determining whether or not to execute determination of S507 (which will be described later), and is preset. For example, a value of Na is 10. When the CPU 10 determines that the value of the counter of number of processing times Cnt is not Na (S506: No), the CPU 11 executes determination of S507. That is, the CPU 11 determines whether a value of the variable "A" set in S504 satisfies a range of Y−(B+C)<A<Y+B+C (S507). The inequality of S507 is equivalent to an equation for determining whether the value of the reading position "Y" randomly determined in S501 falls within the range of (B+C) in the sub-scanning direction from the value of the variable "A", i.e., the dust detected position Q stored in the dust storage area 14a.

In the inequality of S507, B indicates a value of the variation "B" calculated in S503, and C indicates a preset value depending on a width of a factor (for example, the dust) causing an abnormal image. In the first illustrative embodiment, it is assumed that an entire width of the factor causing an abnormal image is 2 pixels, and 1 pixel is prepared as a value of C.

When the CPU 11 determines that the value of the variable "A" satisfies the inequality in S507 (S507: Yes), the CPU 11 proceeds to S502. That is, when the value of the reading position "Y" determined in S501 falls within the range of (B+C) from the value of the variable "A" in the sub-scanning direction, the CPU 11 again randomly determines the value of Y.

On the other hand, when the CPU 11 determines that the value of the variable "A" does not satisfy the inequality in S507 (S507: No), the CPU 11 sets a next value in the dust storage area 14a as the variable "A" (S508). The CPU 11 determines whether the value of the variable "A" set in S508 is equal to the end designating value R (S509). When the CPU 11 determines that the value of the variable "A" set in S508 is not equal to the end designating value R (S509: No), the CPU 11 proceeds to S507.

On the other hand, when the CPU 11 determines that the value of the variable "A" set in S508 is equal to the end designating value R (S509: Yes), the CPU 11 sets a reading position to the reading position "Y" (S510) and ends the reading position setting processing.

When the CPU 11 determines in S506 that the value of the counter of number of processing times Cnt is Na (S506: Yes), the CPU 11 determines whether it is possible to change the drive table to a drive table in which a higher movement resolution of the CIS 17 than the movement resolution in the drive table being currently applied is defined (S511). That is, the CPU 11 determines whether there is a drive table in which a higher movement resolution than the movement resolution defined in the drive table being currently applied is defined, as the drive table to be used when moving the CIS 17 from the standby position to the reading position.

When the CPU 11 determines that the drive table can be changed (S511: Yes), the CPU 11 changes the drive table to be used when moving the CIS 17 from the standby position to the reading position to a drive table in which a higher movement resolution than the movement resolution defined in the drive table being currently applied is defined (S517), and proceeds to S501.

On the other hand, when the CPU 11 determines that the drive table cannot be changed (S511: No), the CPU 11 randomly determines a value of the reading position "Y" in the same manner as S501 (S512). The CPU 11 sets a value stored in the first area P of the dust storage area 14a as the variable "A" (S513).

The CPU 11 determines whether the value of the variable "A" is equal to the value of the reading position "Y" determined in S512 (S514). When the CPU 11 determines that the value of the variable "A" is equal to the value of the reading position "Y" (S514: Yes), the CPU 11 proceeds to S401. In other words, when the value of the reading position "Y" determined in S501 is stored in the dust storage area 14a as a dust detected position Q, the CPU 11 determines a value of the reading position "Y" at random again.

When the CPU 11 determines that the value of the variable "A" is not equal to the value of the reading position "Y" determined in S512 (S514: No), the CPU 11 sets a next value in the dust storage area 14a as the variable "A" (S515). The CPU 11 determines whether the value of the variable "A" set in S515 is equal to the end designating value R (S516). When the CPU 11 determines that the value of the variable "A" set in S515 is not equal to the end designating value R (S516: No), the CPU 11 proceeds to S514. In other words, as the value of the variable "A" set in S515 is a dust detected position Q, the CPU 11 determines whether the dust detected position Q is equal to the value of the reading position "Y" that is currently set.

When the CPU 11 determines that the value of the variable "A" set in S515 is equal to the end designating value R (S516: Yes), the CPU 11 sets the reading position "Y" to the value determined in S401 (S510), the CPU 11 ends the reading position setting processing.

According to the reading position setting processing (S402), the reading position of the CIS 17 is set to the position spaced beyond the predetermined range from the dust detected position Q stored in the dust storage area 14a, more specifically, the range of (B+C) in the sub-scanning direction. Therefore, since it is possible to reduce the possibility that the CIS 17 moving from the standby position towards the reading position will read the dust detected position Q stored in the dust storage area 14a, it is possible to suppress an abnormal image, which is to be caused due to the dust and the like, with high precision.

Particularly, regarding the dust detected position Q, since the range that is to be excluded from the reading position of the CIS 17 is (B+C), it is possible to exclude the influences by the error of the position at which the CIS 17 moving from the standby position towards the reading position actually arrives, and the magnitude of the factor (for example, the dust) causing the abnormal image. Therefore, it is possible to set the reading position of the CIS 17 to an appropriate position at which it is possible to suppress the abnormal image with high precision.

Also, since it is possible to set the reading position of the CIS 17 within the range W, which is predetermined as the range in which an image quality is not impaired, the deterioration of the image quality, which is to be caused as the dust detected position Q is avoided, is not caused. Also, since the value of the reading position "Y" is randomly determined, it is possible to increase the probability to avoid the dust detected position Q at an early stage. Therefore, it is possible to quickly set the value of the reading position "Y".

In case that the processing (S502) of randomly determining the value of the reading position "Y" is executed by (Na−1) times, when it is determined in S511 that the drive table can be changed, the drive table being currently applied is changed to the drive table in which a higher movement resolution than the movement resolution defined in the drive table being currently applied is defined. Thereby, since it is possible to decrease the value of the movement error E2 of the CIS 17 relating to the calculation of the variation "B", it is possible to decrease the value of the variation "B". Therefore, regarding the dust detected position Q, it is possible to narrow the range that is to be excluded from the reading position of the CIS 17. As the range is narrower, the reading position of the CIS 17 can be more easily set. Therefore, it is possible to quickly set the reading position of the CIS 17 by a configuration where the drive table is to be switched after the predetermined number of times.

On the other hand, when it is determined in S511 that the drive table cannot be changed, the reading position of the CIS 17 is set to a position, which does not coincide with the dust detected position Q, without providing the range with respect to the dust detected position Q. The range with respect to the dust detected position Q is not provided, so that it is possible to reduce the possibility that the reading position of the CIS 17 cannot be set. Therefore, it is possible to suppress a situation where the reading position cannot be set and the reading cannot be thus performed.

FIG. 6 is a flowchart depicting the dust storage processing (S416). The CPU 11 sets a dust detection flag to "0" (S601). "The dust detection flag" is a flag specifying whether such a possibility that causes an abnormal image, e.g., a foreign matter such as dust on the second platen glass 45, is detected. The dust detection flag is stored in the RAM 13. One ("1") set to the dust detection flag represents that dust is detected. Zero ("0") set to the dust detection flag represents that dust is not detected.

The CPU 11 controls the CIS 17 to read the white reference plate 60 disposed at a position to oppose the CIS 17, via the second platen glass 45, for one line at the reading position "Y" that is currently set (S602). The reference plate 60 is not limited to a white reference plate but may be a gray reference plate. The CPU 11 sets a first pixel in a line of pixels which extends in the main-scanning direction in image data obtained by the reading in S602 as a subject pixel (S603). All pixels in the line have a same value of position in the sub-scanning direction.

The CPU 11 determines whether a value of the subject pixel exceeds a threshold value (S604). When the CPU 11 determines that a value of the subject pixel does not exceed the threshold value (S604: No), the CPU 11 determines that the image data obtained by reading the reference plate 60 has an abnormality, e.g., such a possibility that causes an abnormal image is detected, the CPU 11 sets the dust detection flag to "1" (S605). Then, the CPU 11 proceeds to S426. When the CPU 11 determines that a value of the subject pixel exceeds the threshold value (S604: Yes), the CPU 11 skips the process in S425 and proceeds to S426.

In S606, the CPU 11 determines whether determination of S604 is made for all the pixels of the image data obtained by the reading in S602 (S606). When the CPU 11 denies the determination in S606 (S606: No), the CPU 11 sets a next pixel in the line of pixels as a subject pixel (S609). Then, the CPU 11 proceeds to S604. The determination as to whether a value of the subject pixel exceeds a threshold value in S604, etc., includes a process of comparing data based on the value of the pixel with data corresponding to the threshold value to determine whether the value of the subject pixel exceeds the threshold value. For example, the process of comparing the inverse of the value of the pixel with the inverse of the threshold value may be one aspect of the determination as to whether the value of the subject pixel exceeds the threshold value.

When the CPU 11 affirms the determination in S606 (S606: Yes), the CPU 11 determines whether the dust detection flag is set to "1" (S607). When the CPU 11 determines that the dust detection flag is not set to "1" (S607: No), the CPU 11 ends the dust storage processing. If the dust detection flag is set to "1", that means there is at least one pixel in the line whose value does not exceed the threshold value.

When the CPU 11 determines that the dust detection flag is set to "1" (S607: Yes), the CPU 11 stores, in the dust storage area 14*a*, a sub-scanning position with respect to a position of such a possibility that causes an abnormal image, e.g., a position of a pixel whose value do not exceed the threshold value, as a dust detected position Q (S608). The CPU 11 ends the dust storage processing. Incidentally, when there are a plurality of pixels which do not exceed the threshold value, the CPU 11 stores each position of the pixels in the sub-*scanning direction in the dust storage area 14*a*.

According to the first illustrative embodiment, as described above, since the reading position of the CIS 17 is set to the position spaced from the dust detected position Q stored in the dust storage area 14*a* beyond the range (B+C) in the sub-scanning direction, it is possible to suppress the abnormal image due to the dust and the like with high precision.

Also, since the dust detected position Q detected in the time period after the document is read is reflected as regards the reading position of the CIS 17 upon a next reading and thereafter, it is possible to suppress the abnormal image due to the dust and the like and to quickly initiate the document reading. Also, whenever the CPU 11 receives the reading instruction, i.e., whenever one reading job is received, the CPU 11 sets the reading position of the CIS 17 to avoid the position at which an abnormal image is likely to occur. Therefore, it is possible to appropriately execute the one reading job.

Subsequently, a second illustrative embodiment is described with reference to FIGS. 7 to 9. In the first illustrative embodiment, a position in the main-scanning direction (hereinafter, referred to as 'main-scanning position') is not considered as the dust detected position Q. In the second illustrative embodiment, the main-scanning position is also considered as the dust detected position Q. In the second illustrative embodiment, the same parts as the first illustrative embodiment are denoted with the same reference numerals and the descriptions thereof are omitted. In the meantime, the CPU 11 executes the respective processing depicted in respective flowcharts of FIGS. 7 to 9, in accordance with the control program 12*a* of the second illustrative embodiment.

Figure 7A:
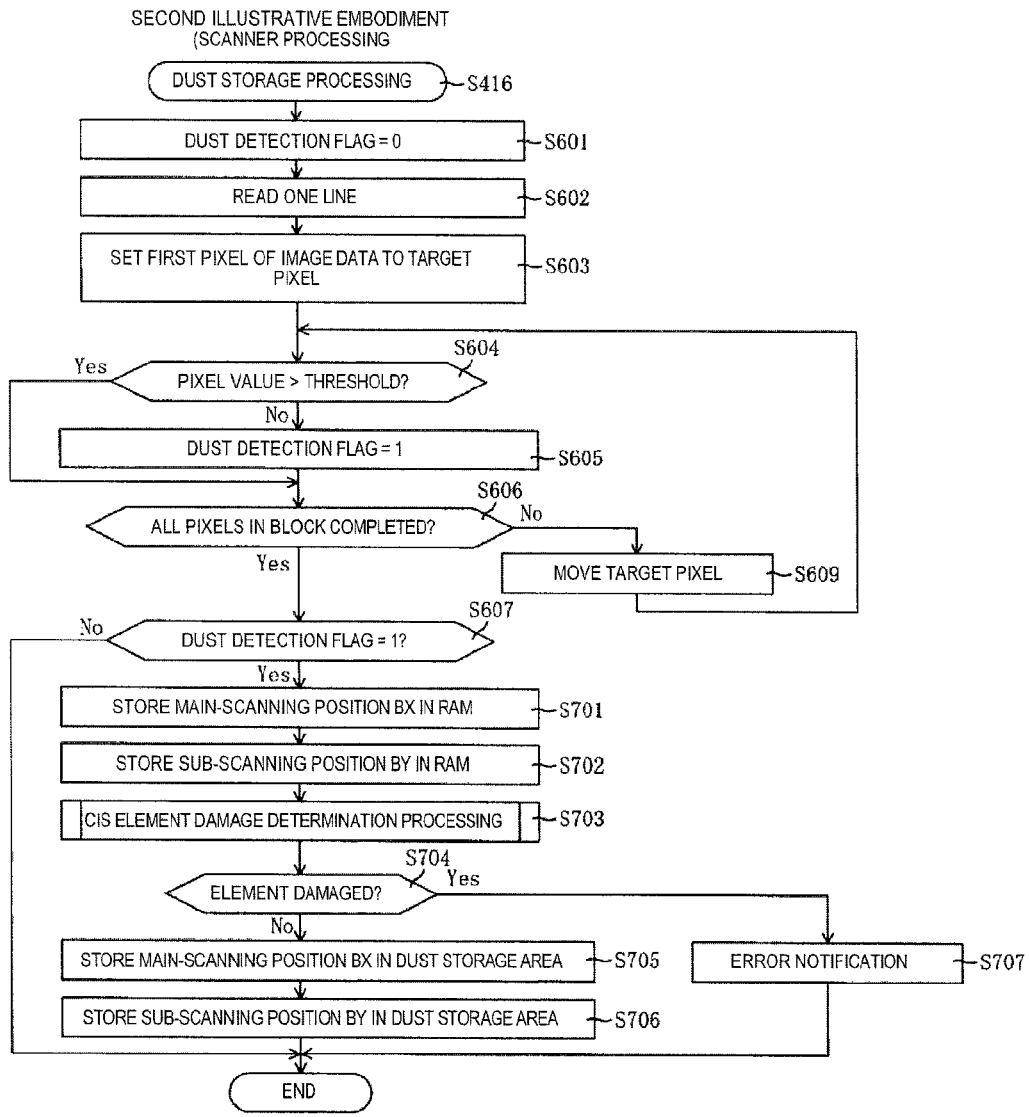
FIG. 7A is a flowchart depicting dust storage processing of a second illustrative embodiment.
Figure 7B:
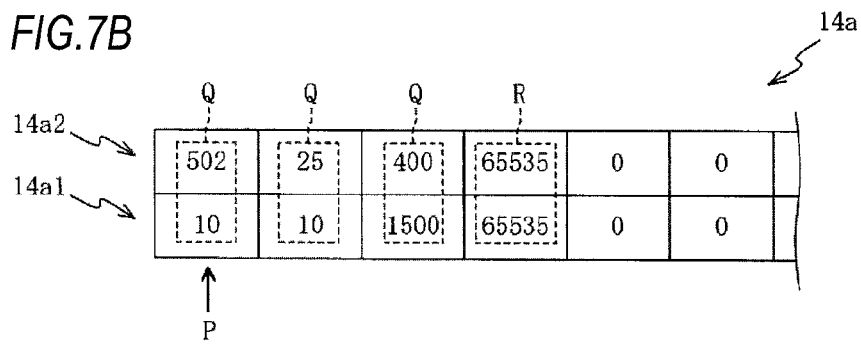
FIG. 7B is a pictorial view for illustrating the dust storage area of the second illustrative embodiment.

FIG. 7A is a flowchart depicting the dust storage processing (S416) of the second illustrative embodiment. Meanwhile, in this illustrative embodiment, the dust storage area 14*a* provided in the EEPROM 14 has a first area 14*a*1 configured to store therein the main-scanning position of the dust detected position Q and a second area 14*a*2 configured to store therein a sub-scanning position of the dust detected position Q.

In this illustrative embodiment, regarding the dust detected position Q, the position in the main-scanning direction (i.e., the main-scanning position) and a position in the sub-scanning direction (hereinafter, referred to as 'sub-scanning position') are sequentially stored from the first areas P of the first area 14*a*1 and the second area 14*a*2. That is, values stored in K-th areas from the first areas P in each of the first area 14*a*1 and the second area 14*a*2 represent the main-scanning position and the sub-scanning position of one dust detected position Q, respectively. Meanwhile, the end designating value R is stored in each of the first area 14*a*1 and the second area 14*a*2, like the first illustrative embodiment.

Differences between the dust storage processing (FIG. 6) of the first illustrative embodiment and the dust storage processing of the second illustrative embodiment (FIG. 7A) will be mainly described. In S607, when the CPU 11 determines that the dust detection flag is set to "1" (S607: Yes), the CPU 11 stores a main-scanning position BX and a sub-scanning position BY of a pixel whose value does not exceed the threshold value in the RAM 13 (S701, S702).

The CPU 11 executes CIS element damage determination processing (S703). As will be described in detail with reference to FIG. 8, in the CIS element damage determination processing (S703), the CPU 11 determines whether an abnormality in image data obtained by reading the reference plate 60 is attributable to an abnormality of a light receiving element of the image sensor of the CIS 17.

In the CIS element damage determination processing (S703), when the CPU 11 determines that an abnormality in the image data is not attributable to damage on a light receiving element (S704: No), the CPU 11 stores, in the first area 14*a*1 of the dust storage area 14*a*, the main-scanning position BX stored in the RAM 13 (S705). Thereafter, the CPU 11 stores, in the second area 14*a*2 of the dust storage area 14*a*, the sub-scanning position BY stored in the RAM 13 (S706). Then, the CPU 11 ends the dust storage processing.

On the other hand, in the CIS element damage determination processing (S703), when the CPU 11 determines that an abnormality of the image data is attributable to damage on a light receiving element (S704: Yes), the CPU 11 performs a predetermined error notification, e.g., indication of an error on the display unit 16 (S707). Then, the CPU 11 ends the dust storage processing.

In S704 to S607, when the CPU 11 determines that an abnormality of the image data is attributable to damage of a light receiving element, a position where the abnormality is detected is not stored in the dust storage area 14*a*. When an abnormality of the image data is attributable to damage of a light receiving element, occurrence of an abnormal image will not be prevented even if a reading position is set to avoid the position of the detected abnormality. Therefore, in this case, the position data where the abnormality is detected is not stored in the dust storage area 14*a*, so that consumption of the storage capacity of the EEPROM 14 may be suppressed. Also, in this case, an error notification may be provided. Therefore, the scanner 10 may be dispatched for repair soon, and restored to its normal condition early.

FIG. 8 is a flowchart depicting the CIS element damage determination processing (S703). The CPU 11 stores values of the respective sub-scanning positions, which are to be stored in the second area 14a2 of the dust storage area 14a, as an array GY in the RAM 13 (S801). The CPU 11 stores values of the respective main-scanning positions, which are to be stored in the first area 14a1 of the dust storage area 14a, as an array GX in the RAM 13 (S802).

The CPU 11 sets a variable "i" to "0" (S803). The CPU 11 determines whether the value of "GX[i]" in the array GX is equal to a value of the main-scanning position BX stored in the RAM 13 in S705 of previous dust storage processing (S804). When the CPU 11 determines that both values are equal (S804: Yes), the CPU 11 determines whether "−N<GY[i]−BY<N" is satisfied (S805). A unit of the threshold value N is given in pixels. In other words, the CPU 11 determines whether a distance between GY[i] in the array GY and the sub-scanning position BY stored in the RAM 13 in S706 is less than N pixels. In the meantime, the threshold value N varies according to values of the reading resolutions. For example, when the reading resolution is 300 dpi, "N=10" (pixels) and when the reading resolution is 600 dpi, "N=20" (pixels).

When the CPU 11 determines that "−N<GY[i]−BY<N" is not satisfied, i.e., that the distance between "GY[i]" and the sub-scanning position BY is spaced apart by "N" pixels or greater (S805: No), the CPU 11 determines that abnormalities of the image data at a position specified by "GX[i]" and "GY[i]" and at a position specified by the values of the main-scanning position BX and the sub-scanning position BY are attributable to damages of light receiving elements. In this case, therefore, the CPU 11 performs processing of S806 to S809, and ends the CIS element damage determination processing.

Specifically, the CPU 11 deletes "GX[i]" and "GY[i]" from the arrays GX and GY, respectively (S806). The CPU 11 deletes the values of the main-scanning position BX and the sub-scanning position BY from the RAM 13 (S807). The CPU 11 deletes, from the first area 14a1 and the second area 14a2 of the dust storage area 14a, the values corresponding to the respective "GX[i]" and "GY[i]" deleted in S806 (S808). The CPU 11 rearranges values in the first area 14a1 and the second area 14a2 of the dust storage area 14a, to next areas therein closer to the respective first areas P (S809).

On the other hand, when the CPU 11 determines that the value of "GX[i]" and a value of the main-scanning position BX are not equal (S804: No), the CPU 11 proceeds to S810. When the CPU 11 determines that "−N<GY[i]−BY<N" is satisfied (S805: Yes), the CPU 11 proceeds to S810.

In S810, the CPU 11 adds "1" to the variable "i" (S810). The CPU 11 determines whether the value of "GX[i]" is the end designating value R of "65535" (S811). When the CPU 11 determines that the value of "GX[i]" is not "65535" (S811: No), the CPU 11 proceeds to S804. On the other hand, when the CPU 11 determines that the value of "GX[i]" is "65535" (S811: Yes), the CPU 11 ends the CIS element damage determination processing.

In the CIS element damage determination processing (S703), the CPU 11 determines that a light receiving element is damaged when a position, which is the same as the main-scanning position BX with respect to the main-scanning direction and is spaced apart by the threshold value N or greater from the sub-scanning position BY, is stored, as the dust detected position Q, in the first area 14a1 and the second area 14a2 of the dust storage area 14a, respectively.

In the meantime, when there exists a plurality of combinations of the main-scanning position BX and the sub-scanning position BY, the CPU 11 determines for each combination whether a value of "GX[i]" and a value of a main-scanning position BX are the same and a distance between a value of GY[i] and a value of the sub-scanning direction BY is spaced apart by the threshold value N or greater. When the CPU 11 affirms the determination, the CPU 11 determines that a light receiving element is damaged.

Figure 9:
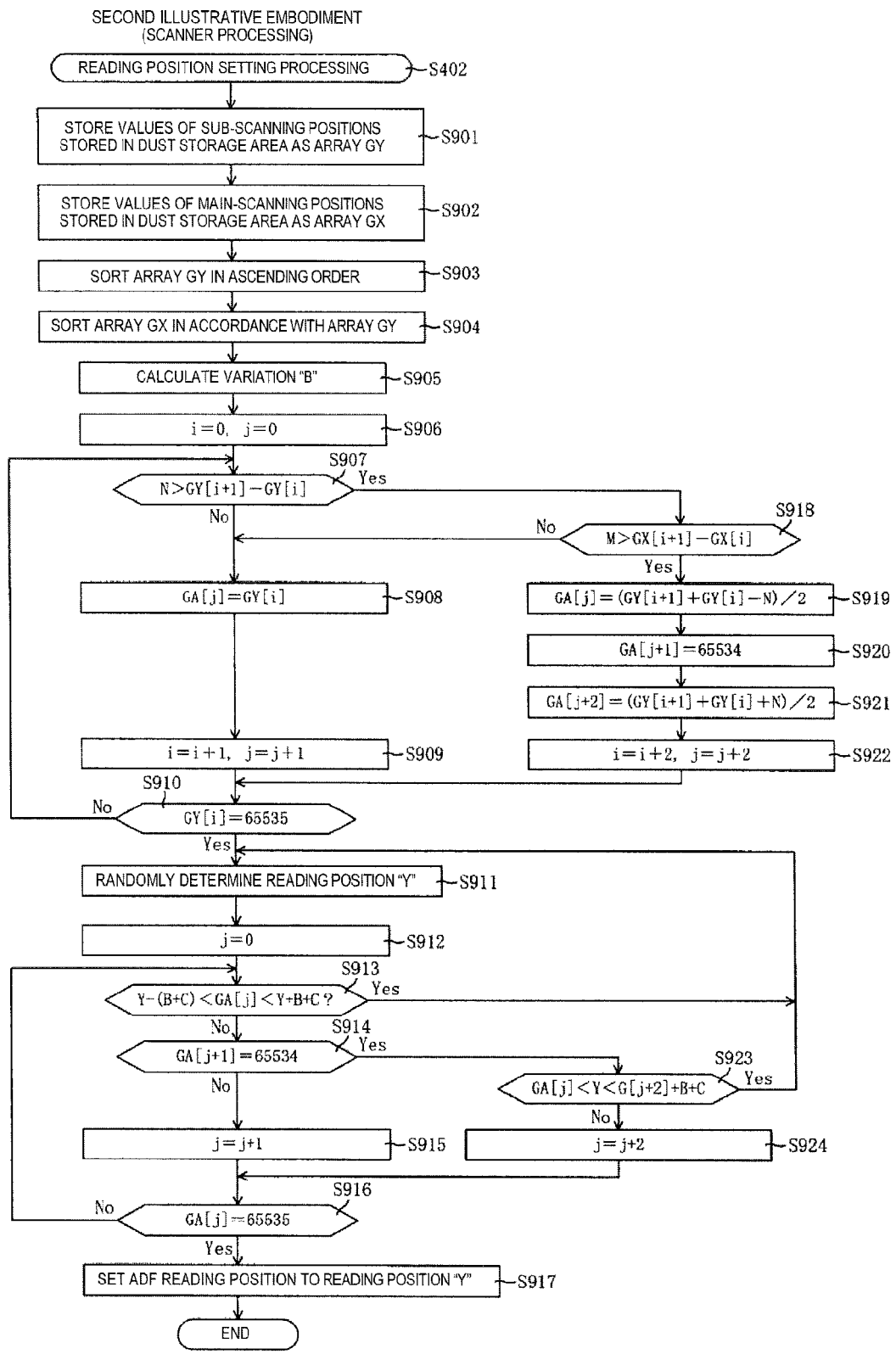
FIG. 9 is a flowchart depicting the reading position setting processing of the second illustrative embodiment.

FIG. 9 is a flowchart depicting the reading position setting processing (S402) according to the second illustrative embodiment. The CPU 11 stores values of the sub-scanning positions stored in the second area 14a2 of the dust storage area 14a, as an array GY in the RAM 13 (S901). The CPU 11 stores values of the main-scanning positions stored in the first area 14a1 of the dust storage area 14a, as an array GX in the RAM 13 (S902). In the reading position setting processing of the second illustrative embodiment, when the dust detected position is not stored in the dust storage area 14a, i.e., when the end designating value R is stored in the first area P of the dust storage area 14a, the CPU 11 performs only processing of S911 and S917.

The CPU 11 sorts the array GY in an ascending order (S903). The CPU 11 sorts the array GX in accordance with the array GY (S904). The CPU 11 calculates the variation "B", like the processing of S503 (S905). That is, the CPU 11 calculates a sum of the detection error E1 of the standby position and the movement error E2 of the CIS 17, as the variation "B". The CPU 11 sets the variable i and the variable j to "0" (S906).

The CPU 11 determines whether "N>GY[i+1]−GY[i]" is satisfied (S907). The threshold value "N" is the same threshold value used in S805 of the CIS element damage determination processing (FIG. 8). Therefore, the CPU 11 determines in S907 whether the distance between adjacent positions in the array GY sorted in ascending order is less than "N" pixels When the CPU 11 determines that "N>GY[i+1]−GY[i]" is not satisfied (S907: No), the CPU 11 sets the value of GY[i] as a value of "GA[j]" in an array GA (S908). The array GA is an array representing sub-scanning positions with respect to the dust detected positions Q that are rearranged in consideration of the distances between dust detected positions Q. The array GA is stored in the RAM 13. After the processing of S908, the CPU 11 adds "1" to each of values of the variables "i" and "j" (S909). Then, the CPU 11 proceeds to S910.

On the other hand, when the CPU 11 determines that "N>GY[i+1]−GY[i]" is satisfied (S907: Yes), the CPU 11 determines whether "M>GX[i+1]−GX[i]" is satisfied (S918). A unit of the threshold value "M" is given in pixels, like the threshold value "N". The threshold value M varies according to values of reading resolutions. For example, when the reading resolution is 300 dpi, "M=10" (pixels) and when the reading resolution is 600 dpi, "M=20" (pixels).

When the CPU 11 determines that "M>GX[i+1]−GX[i]" is not satisfied (S918: No), the CPU 11 proceeds to S908. On the other hand, when the CPU 11 determines that "M>GX[i+1]−GX[i]" is satisfied (S918: Yes), the CPU 11 determines that a dust detected position Q specified by "GY[i]" and "GX[i]" and a dust detected position Q specified by "GY[i+1]" and "GX[i+1]" are based on one lump of dust. In this case, therefore, the CPU 11 performs processing of S919 to S921.

Specifically, the CPU 11 sets "(GY[i+1]+GY[i]−N)/2" as "GA[j]" (S919). The CPU 11 sets "65534" to "GA[j+1]" (S920). The CPU 11 sets "(GY[i+1]+GY[i]+N)/2" as "GA[j+2]" (S921). After the processing of S921, the CPU 11 adds "2" to each of the values of the variable "i" and the variable "j" (S922) and proceeds to S910.

The value "65534" set in "GA[j+1]" in S920 represents that a range from "GA[j]" to "GA[j+2]" is a series of dust areas (hereinafter, the value is referred to as "continuous area designation value"). As a continuous area designation value, a value that cannot be taken as the dust detected position Q, e.g., "65534" is employed.

Therefore, in S919 to S921, when the distance between "GY[i]" and "GY[i+1]" is shorter than "N" pixels and the distance between "GX[i]" and "GX[i+1]" is shorter than "M" pixels, the CPU 11 sets, in the array GA, that a range of ±(N/2) from the center between "GY[i]" and "GY[i+1]" in the sub-scanning direction is a series of dust areas.

In S910, the CPU 11 determines whether the value of GY[i] is "65535", which is the end designating value R (S910). When the CPU 11 determines that the value of "GY[i]" is not "65535" (S910: No), the CPU 11 proceeds to S907. When the CPU 11 determines that the value of "GY[i]" is "65535" (S910: Yes), the CPU 11 randomly determines the value of the reading position "Y" in the same manner as S502 (S911).

The CPU 11 sets the variable "j" to "0" (S912). The CPU 11 determines whether the value of "GA[j]" in the array GA satisfies the range of Y−(B+C)<"GA[j]"<Y+B+C (S913). The inequality of S913 corresponds to an equation for determining whether the value of the reading position "Y" randomly determined in S911 falls within the range of (B+C) from the value of "GA[j]" in the sub-scanning direction. In the meantime, in the inequality of S913, the value "B" is a value calculated in S905. The value "C" is a value that is prepared in advance as a value depending on the width of the factor (for example, the dust) causing an abnormal image, like S507.

When the CPU 11 determines that the value of "GA[j]" satisfies the inequality of S913 (S913: Yes), the CPU 11 proceeds to S911. That is, when the value of the reading position "Y" determined in S911 falls within the range of the range (B+C) from the value of "GA[j]" in the sub-scanning direction, the CPU 11 again randomly determines a value of the reading position "Y".

On the other hand, when the CPU 11 determines that the value of "GA[j]" does not satisfy the inequality of S913 (S913: No), the CPU 11 determines whether the value of "GA[j]" is the continuous area designation value (e.g., "65534" in this illustrative embodiment) (S914). When the CPU 11 determines that "GA[j]=65534" (S914: Yes), the CPU 11 determines whether "GA[j]<Y<GA[j+2]+B+C" is satisfied (S923).

In other words, the inequality of S923 is equivalent to an equation of determining whether the value of the reading position "Y" randomly determined in S911 is between "GA[j]" and a position spaced from "GA[j+2]" by (B+C) towards an opposite side to "GA[j]" in the sub-scanning direction. When the CPU 11 determines that the value of the reading position "Y" satisfies the inequality of S923 (S923: Yes), the CPU 11 proceeds to S911. That is, when the value of the reading position "Y" determined in S911 falls within the range of (B+C) from both ends of the range from "GA[j]" to "GA[j+2]" in the sub-scanning direction, the CPU 11 again randomly determines the value "Y".

On the other hand, when the CPU 11 determines that the value of the reading position "Y" does not satisfy the inequality of S923 (S923: No), the CPU 11 adds "2" to the value of the variable "j" (S924). Also, when the CPU 11 determines in S914 that "GA[j]" is not 65534 (S914: No), the CPU 11 adds "1" to the value of the variable "j" (S915).

After the processing of S915 or S924, the CPU 11 determines whether the value of "GA[j]" is the end designating value R of "65535" (S916). When the CPU 11 determines that the value of "GA[j]" is not "65535" (S916: No), the CPU 11 proceeds to S913. In other words, the CPU 11 performs the processing of S913 for a next value in the array GA. On the other hand, when the CPU 11 determines that the value of "GA[j]" is "65535" (S916: Yes), the CPU 11 sets the reading position to the value of the reading position "Y" (S917). Then, the CPU 11 ends the reading position setting processing.

According to the second illustrative embodiment, it is possible to suppress occurrence of an abnormal image more favorably because not only the sub-scanning position but also the main-scanning position is taken into consideration with respect to the dust detected position Q. Also, since the main-scanning position is taken into consideration, it is possible to perform the processing while discriminating contamination of the platen and damage on the light receiving element of the CIS 17.

Also, two dust detected positions Q closer to each other may be attributable to the common dust. Therefore, when the distance between the two dust detected positions Q is short, it is possible to favorably suppress the occurrence of the abnormal image by excluding a position between the dust detected positions Q from a candidate for the reading position of the CIS 17.

Also, even when two dust detected positions Q are closer to each other, the reading position of the CIS 17 is set to a position spaced from the one dust detected position Q beyond the range of (B+C) in the sub-scanning direction and also spaced from the other dust detected position Q beyond the range of (B+C) in the sub-scanning direction. Therefore, also in the second illustrative embodiment, it is possible to suppress the occurrence of the abnormal image due to the dust and the like with high precision, like the first illustrative embodiment.

Subsequently, a third illustrative embodiment is described with reference to FIG. 10A. In the first illustrative embodiment, on condition that the value of the reading position "Y" randomly selected as a candidate for the reading position is spaced from the dust detected position Q stored in the dust storage area 14a by the predetermined range or greater, the selected value of the reading position "Y" is determined as the reading position.

In the third illustrative embodiment, whenever a possibility that an abnormal image will be caused is detected, the reading position is moved from an origin (for example, an end in the arrow B direction) of the second platen glass 45 in the sub-scanning direction to a position spaced from the origin by a predetermined range. That is, the reading position is moved to a position spaced by a predetermined range from a position, which is most spaced from the origin of the second platen glass 45 in the sub-scanning direction, of the positions indicated by the dust detected positions Q stored in the dust storage area 14a. In the third illustrative embodiment, the same parts as the first illustrative embodiment are denoted with the same reference numerals, and the descriptions thereof are omitted.

Figure 10A:
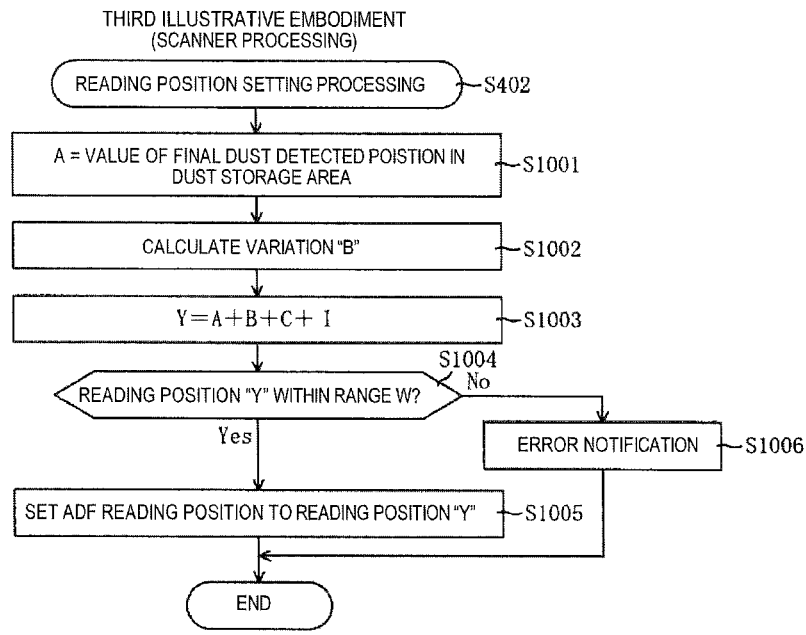
FIGS. 10A to 10C are flowcharts depicting the reading position setting processing of a third illustrative embodiment, power-on processing, and periodic processing, respectively.

FIG. 10A is a flowchart depicting the reading position setting processing (S402) of the third illustrative embodiment. The CPU 11 performs the reading position setting processing in accordance with the control program 12a of the third illustrative embodiment. The CPU 11 sets the final dust detected position Q of the dust detected positions stored in the dust storage area 14a to the variable "A" (S1001). Specifically, the CPU 11 acquires the dust detected position Q, which is stored just before the end designating value R, of the dust detected positions stored in the dust storage area 14a.

In the meantime, when the dust detected position is not stored in the dust storage area 14a, the CPU 11 sets a value, which is preset as an initial position of the reading, to the variable "A", in S1001. The initial position of the reading should be a value within the range W. For example, the value '0', which is closest to the origin in the range W, or a value of a center of the range W in the sub-scanning direction may be exemplified. Alternatively, instead of the specific position such as the origin and the center, other appropriate value such as '200' may be set as the initial position of the reading inasmuch as it falls within the range W.

Meanwhile, in the third illustrative embodiment, whenever a possibility that an abnormal image will be caused is detected, the reading position is sequentially moved from the origin of the second platen glass 45 in the sub-scanning direction towards a side getting away from the origin. Therefore, the value acquired in S1001 is the dust detected position Q indicating a position, which is most spaced from the origin of the second platen glass 45 in the sub-scanning direction, of the dust detected positions Q stored in the dust storage area 14a.

Like S503, the CPU 11 calculates the variation "B" (S1002), like the processing of S503. That is, the CPU 11 calculates a sum of the detection error E1 of the standby position and the movement error E2 of the CIS 17, as the variation "B". The CPU 11 sets, as the reading position "Y", a sum of the value of the variable "A" set in S1001, the value of the variation (difference) B calculated in S1002, and the number of steps I of the motor 18a per one interrupt by the line end interrupt processing (S1003).

The CPU 11 determines whether the value of the reading position "Y" set in S1003 falls within the range W (S1004). When the CPU 11 determines whether the value of the reading position "Y" set in S1003 falls within the range W (S1004: Yes), the CPU 11 sets a reading position to the value of the reading position "Y" (S1005) and ends the reading position setting processing.

On the other hand, when the CPU 11 determines whether the value of the reading position "Y" does not fall within the range W (S1004: No), the CPU 11 performs a predetermined error notification, e.g., indication of an error on the display unit 16 (S1006) and ends the reading position setting processing. Meanwhile, in the third illustrative embodiment, when the error notification is performed in S1006, the CPU 11 does not execute the processing of S403 and thereafter in the ADF reading processing of FIG. 4.

According to the third illustrative embodiment, the reading position of the CIS 17 is set to the position spaced from the dust detected position Q stored in the dust storage area 14a by the sum of the range of (B+C) and the number of steps I of the motor 18a per one interrupt by the line end interrupt processing. Therefore, it is possible to simply set the reading position of the CIS 17 to the position at which it is possible to suppress the occurrence of the abnormal image due to the dust and the like with high precision.

In particular, since the dust detected position Q, which indicates the position most spaced from the origin of the second platen glass 45 in the sub-scanning direction, is used, it is possible to sequentially set the reading position of the CIS 17 in the direction of getting away from the origin of the second platen glass 45 in the sub-scanning direction, in the sub-scanning direction. Therefore, it is possible to easily determine the reading position of the CIS 17 from the dust detected position Q.

Next, a fourth illustrative embodiment is described with reference to FIG. 10B. In the fourth illustrative embodiment, at a timing when the power of the scanner 10 is switched to ON, the CPU 11 detects a position at which an abnormal image is likely to occur. In the fourth illustrative embodiment, the same parts as the first illustrative embodiment are denoted with the same reference numerals, and the descriptions thereof are omitted.

Figure 10B:
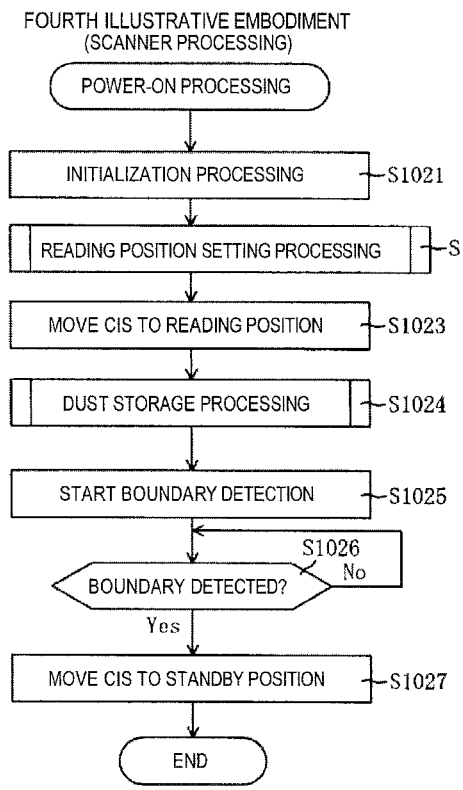

FIG. 10B is a flowchart depicting power-on processing. The power-on processing is started when the power of the scanner 10 is switched from OFF to ON. The CPU 11 performs the power-on processing in accordance with the control program 12a of the fourth illustrative embodiment. In the meantime, the CPU 11 is configured not to receive a reading instruction while the power-on processing is performed.

The CPU 11 performs initialization processing (S1021). In the initialization processing, for example, the CIS 17 is set at an initial position and a document remaining in the ADF 19 is ejected. The CPU 11 performs reading position setting processing (S1022). The reading position setting processing (S1022) is the same as the reading position setting processing (S402). The CPU 11 controls the motor controller 18 to arrange the CIS 17 to the reading position set in the reading position setting processing (S1022) (S1023).

The CPU 11 performs dust storage processing (S1024). The dust storage processing (S1024) is the same as the dust storage processing (S416). After the execution of the dust storage processing (S1024), the CPU 11 executes processing of S1025 to S1027 in the same manner as S417 to S419 and ends the power-on processing. Meanwhile, in the fourth illustrative embodiment, the CPU 11 drives the motor controller 18 in S1025, and executes the reading of the CIS 17 line-by-line while moving the CIS 17 from the initial position upon the power-on towards a downstream side (the arrow F direction) with respect to the sub-scanning direction.

According to the fourth illustrative embodiment, a position at which an abnormal image is likely to occur is detected before a reading instruction is provided, at the timing when the power of the scanner 10 is switched to ON. Therefore, the document reading may be favorably performed based on a first reading instruction after the power of the scanner 10 is switched to ON.

Next, a fifth illustrative embodiment will be described referring to FIG. 10C. In the fifth illustrative embodiment, a position at which an abnormal image is likely to occur is detected at a predetermined timing. In the fifth illustrative embodiment, the same parts as the first illustrative embodiment are denoted with the same reference numerals, and the descriptions thereof are omitted.

Figure 10C:
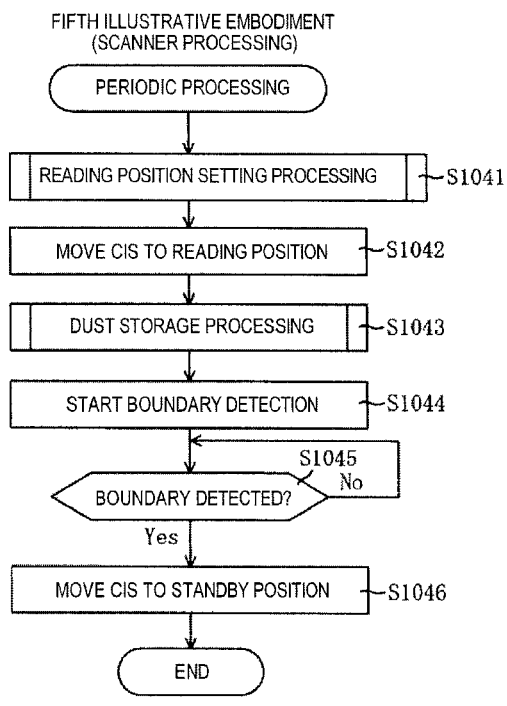

FIG. 10C is a flowchart depicting periodic processing. The periodic processing is started every predetermined time period (for example, one day). The CPU 11 executes the periodic processing in accordance with the control program 12a of the fifth illustrative embodiment.

The CPU 11 executes reading position setting processing (S1041). The reading position setting processing (S1041) is the same as the reading position setting processing (S402). The CPU 11 controls the motor controller 18 to arrange the CIS 17 to the reading position set in the reading position setting processing (S1041) (S1042).

The CPU 11 executes dust storage processing (S1043). The dust storage processing (S1043) is the same as the dust storage processing (S416). The CPU 11 executes processing of S1044 to S1045 in the same manner as S417 to S419, and ends the periodic processing. Meanwhile, in the fifth illustrative embodiment, the CPU 11 drives the motor controller 18 in S1044, and executes the reading of the CIS 17 line-by-line while moving the CIS 17 from the standby position towards a downstream side (the arrow F direction) with respect to the sub-scanning direction.

According to the fifth illustrative embodiment, the position at which an abnormal image is likely to occur is detected at a periodic timing before a reading instruction is provided. Therefore, since the dust detected position Q can be stored in the dust detection area 14a at the periodic timing, the document reading may be performed favorably all the time, based on a reading instruction. In the meantime, the periodic processing may also be executed at a predetermined timing, for example, when the document cover 46 is at an open position.

Figure 11:
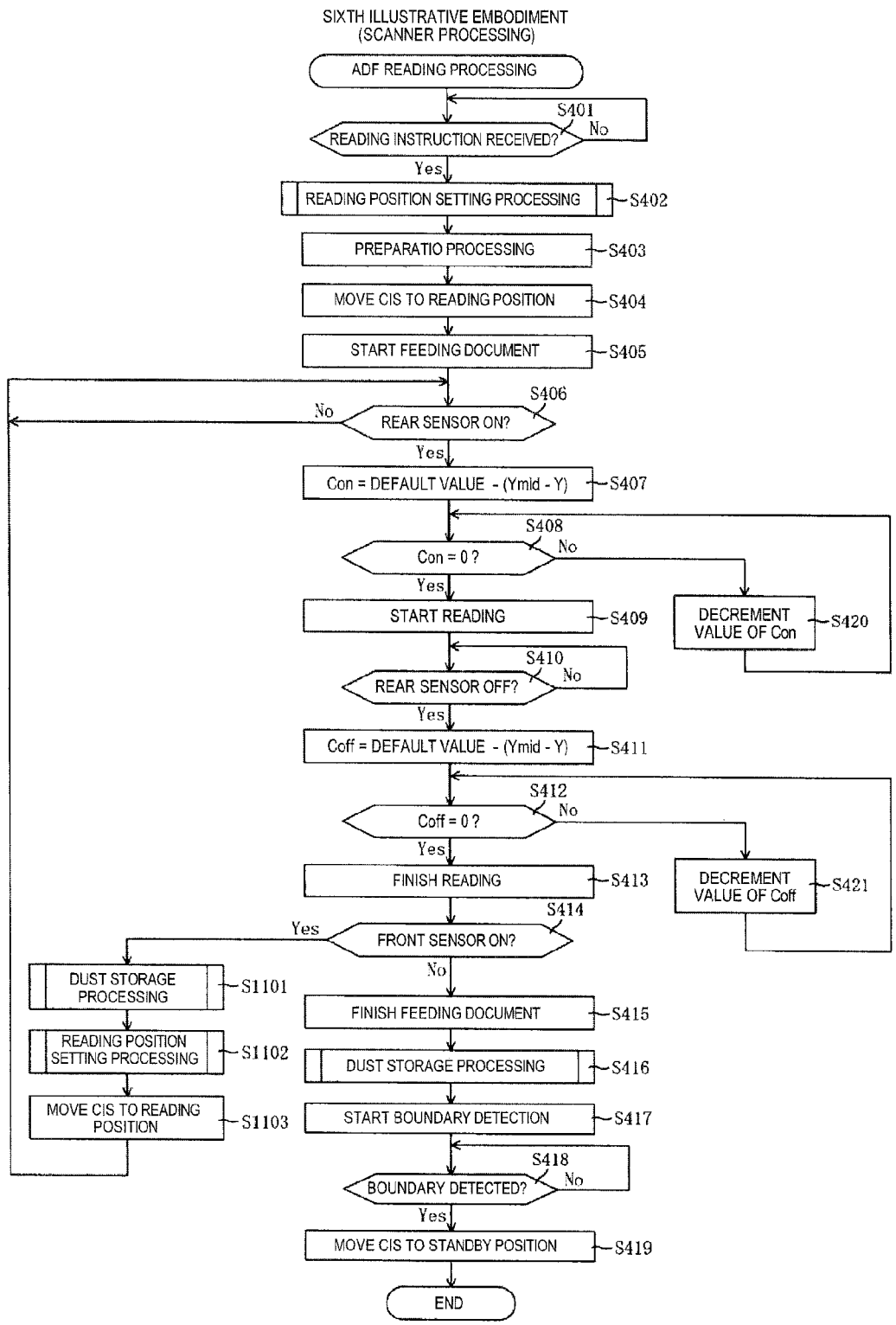
FIG. 11 is a flowchart depicting the ADF reading processing of a sixth illustrative embodiment.

Next, a sixth illustrative embodiment will be described referring to FIG. 11. In the first illustrative embodiment, for every reading job, a reading position of the CIS 17 is set to avoid a position in which an abnormal image is likely to occur. Alternatively, in the second illustrative embodiment, a position in which an abnormal image is likely to occur is detected for every document reading of one page. The detected position is reflected on document reading of the next page.

Like reference numerals denote like corresponding parts and detailed description thereof with respect to the second illustrative embodiment may be omitted herein. FIG. 11 is a flowchart depicting ADF reading processing according to the sixth illustrative embodiment. The CPU 11 performs the ADF reading processing in accordance with a control program 12a of the sixth illustrative embodiment.

Differences from the ADF reading processing (FIG. 4) according to the first illustrative embodiment will be mainly described. When the CPU 11 determines that an ON signal is input from the front sensor 20 after document reading for one page is completed (S414: Yes), the CPU 11 performs dust storage processing (S1101). The dust storage processing (S1001) is similar processing to the above-described dust storage processing (S416).

Thereafter, the CPU 11 performs reading position setting processing (S1102). The reading position setting processing (S1102) is similar processing to the above-described reading position setting processing (S402). The CPU 11 controls the reading drive portion 18 to move the CIS 17 in sub-scanning direction to the reading position set in the reading position setting processing (S1102) (S1103). The CPU 11 proceeds to S406 after S1103.

According to the sixth illustrative embodiment, a reading position of the CIS 17 may be set to a position avoiding a dust detected position Q for every reading of one page. Therefore, even when dust adheres to the second platen glass 45 at the time of reading one page of a document, an influence of the dust may be avoided. Thus, each page of a document may be read preferably.

In the above-described illustrative embodiments, the scanner 10 is an example of the image reading apparatus. The control program 12a is an example of the image reading program. The CPU 11 is an example of the controller. The ADF 19 is an example of the document feeder. The second platen glass 45 is an example of the platen. The CIS 17 is an example of the image reader. The motor controller 18 and the motor 18a are examples of the drive unit. The motor 18a is an example of the stepping motor. The EEPROM 14 is an example of the memory. The drive table is an example of the movement information. The reference plate 60 is an example of the reference plate. The boundary between the black areas 72a, 72c and the white reference part 71 is an example of the reference position. The range W is an example of the reading permitting range.

The CPU 11 configured to execute the processing of S601 to S606 and S609 is an example of the first detection unit. The CPU 11 configured to execute the processing of S608, S705 and S706 is an example of the position storage unit. The CPU 11 configured to execute the processing of S402 and S1102 is an example of the reading position setting unit. The CPU 11 configured to execute the processing of S401 is an example of the instruction receiving unit. The CPU 11 configured to execute the processing of S404 and S1103 is an example of the movement unit. The CPU 11 configured to execute the processing of S409 is an example of the first reading unit.

The CPU 11 configured to execute the processing of S417, S1025 and S1044 is an example of the second reading unit. The CPU 11 configured to execute the processing of S418, S1026 and S1045 is an example of the second detection unit. The CPU 11 configured to execute the processing of S419, S1027 and S1046 is an example of the movement stopping unit. The CPU 11 configured to execute the processing of S503, S905 and S1002 is an example of the range width calculation unit, the first calculation unit, the second calculation unit and the third calculation unit. The CPU 11 configured to execute the processing of S502 and S911 is an example of the first selection unit. The CPU 11 configured to execute the processing of S507 and S913 is an example of the first determination unit.

The CPU 11 configured to execute the processing of S506 is an example of the counting unit. The CPU 11 configured to execute the processing of S512 is an example of the second selection unit. The CPU 11 configured to execute the processing of S514 is the third determination unit. The CPU 11 configured to execute the processing of S511 is the fourth determination unit. The CPU 11 configured to execute the processing of S517 is the second change unit. The CPU 11 configured to execute the processing of S1001 is the position acquisition unit.

Although the disclosure has been described in detail with reference to the illustrative embodiments, the disclosure is not limited to the illustrative embodiments, and various improvements and modifications may be made without departing from the spirit and scope of the disclosure.

For example, in the above-described illustrative embodiments, the scanner 10 is an example of the image reading apparatus of the disclosure. However, the disclosure may be applied to various apparatus, e.g., multi-functional device, configured to perform the document reading using an ADF.

In the second illustrative embodiment, with respect to the two dust detected positions Q, when the distance between the main-scanning positions thereof is equal to or less than a predetermined distance and the distance between the sub-scanning positions thereof is equal to or less than a predetermined distance, a position between the two dust detected positions Q is excluded from the reading positions of the CIS 17. Alternatively, with respect to the two dust detected positions Q, when either one of the distance between main-scanning positions thereof and the distance between sub-scanning positions thereof is equal to or less than a predetermined distance, a position between the two dust detected positions Q may be excluded from the reading positions of the CIS 17.

In the above-described illustrative embodiments, the reading position of the CIS 17 is set in the range W which is predetermined as a range in which the image quality is not impaired. In another embodiment, when an area to avoid the dust detected position Q in the sub-scanning direction does not exist in the range W, the reading position of the CIS 17 may be set in an area of the second platen glass 45 in the sub-scanning direction outside the range W. Therefore, even when an area to avoid the dust detected position Q in the sub-scanning direction does not exist in the range W, it is possible to suppress a situation where the document reading is not performed. Also, the reading position of the CIS 17 may be set in the range of the second platen glass 45 in the sub-scanning direction, without considering the range W.

In the first to third and sixth illustrative embodiments, the dust storage processing (S416) is executed in the time period after the document is read. However, the dust storage processing (S416) may be executed before the document is read.

In the third illustrative embodiment, whenever a possibility that an abnormal image will be caused is detected, the reading position is moved from the origin of the second platen glass 45 in the sub-scanning direction to the position spaced from the origin by the predetermined range. Alternatively, whenever a possibility that an abnormal image will be caused is detected, the reading position may be moved from an end opposite to the origin of the second platen glass 45 in the sub-scanning direction to a position spaced from the end by a predetermined range. In this modified embodiment, the CPU 11 calculates a value "A−(B−C−I)" as the reading position "Y" in S1003.

Also in the second illustrative embodiment, like the first illustrative embodiment, the number of times of randomly determining the value of the reading position "Y" in S911 may be counted, and when the number of times exceeds a predetermined number of times, the drive table may be changed, or the CPU 11 may determine whether the reading position of the CIS 17 coincides with the dust detected position Q, without providing the range with respect to the dust detected position Q.

In the third illustrative embodiment, when the CPU 11 determines in S1004 that the value of the reading position "Y" does not fall in the range W, the error notification is performed. However, instead of the error notification, the drive table may be changed so that the movement resolution of the CIS 17 is a higher resolution than the resolution being currently applied, like the first illustrative embodiment.

In the above-described illustrative embodiments, with respect to the dust detected position Q, the range that is to be excluded from the reading position of the CIS 17 is the range of (B+C). However, the range may be configured only by the variation "B", without considering the value "C". Also, in the above-described illustrative embodiments, the variation "B" is calculated as the sum of the detection error E1 of the standby position and the movement error E2 of the CIS 17. In another embodiment, the variation "B" may be set as the detection error E1 of the standby position or the movement error E2 of the CIS 17. Also, the variation "B" may be set as a value obtained by adding a predetermined margin to the sum of the detection error E1 of the standby position and the movement error E2 of the CIS 17 or may be set as a sum of values obtained by multiplying predetermined coefficients by the detection error E1 and the movement error E2, respectively.

In the above-described illustrative embodiments, the CPU 11 performs the respective processing depicted in FIGS. 4A, 5, 6, 7A and 8 to 11. In another embodiment, a plurality of CPUs may perform the corresponding processing in cooperation with each other. Also, an integrated circuit (IC), e.g., an ASIC, may perform the corresponding processing or a plurality of ASICs may perform the corresponding processing in cooperation with each other. Also, the CPU 11 and an IC, e.g., an ASIC, may perform the corresponding processing in cooperation with each other.

A portion of the processing depicted in FIGS. 4A, 5, 6, 7A and 8 to 11 may be omitted or changed without departing from the scope of the disclosure. For example, the processing of S511 and S517 in FIG. 5 may be omitted. Also, the processing of S512 to S516 may be omitted. Also, the features described in conjunction with the respective illustrative embodiments and the above-described modified embodiments may be combined appropriately.

What is claimed is:
1. An image reading apparatus comprising:
a document feeder configured to feed a document in a feeding direction;
a platen;
an image reader configured to read the document, fed by the document feeder, over the platen;
a drive unit configured to move the image reader in a sub-scanning direction parallel to the feeding direction;
a memory; and
a controller,
wherein the controller is configured to execute:
   a first detection process of causing the image reader to read a reference plate at a predetermined reading position to generate read data, and detecting whether the read data has an abnormality;
   a position storage process of, when it is detected in the first detecting process that the read data has the abnormality, storing, in the memory, a detection position where the image reader reads the read data in the sub-scanning direction;
   a reading position setting process of setting a reading position of the image reader in the sub-scanning direction to a set position spaced by a predetermined range or more from the detection position stored in the memory, the set position being located within a range settable as the reading position;
   an instruction receiving process of receiving an instruction to start document reading;
   a movement process of, when the instruction is received in the instruction receiving process, moving, by the drive unit, the image reader under standby at a standby position to the set position set according to the reading position setting process;
   a first reading process of reading the document, fed by the document feeder, by the image reader,
   a second reading process of reading a reference, a position of a portion of the reference being a reference position, with respect to the standby position by the image reader while the image reader is moved according to the movement process in a direction towards the reference position;
   a second detection process of detecting the reference position based on data obtained by the image reader according to the second reading process;

a movement stopping process of stopping the drive unit moving the image reader according to the movement process at the standby position after the reference position is detected according to the second detection process; and a range width calculation process of calculating a width of the predetermined range in accordance with a value indicating a detection error of the reference position according to the second detection process.

2. The image reading apparatus according to claim 1, wherein the controller is configured to execute the range width calculation process of calculating the width of the predetermined range in accordance with a value indicating a movement error of the image reader moved by the drive unit.

3. The image reading apparatus according to claim 1, wherein the image reader is configured to read the document line-by-line in a main-scanning direction perpendicular to the sub-scanning direction, the drive unit includes a stepping motor configured to move the image reader, movement information defining a movement resolution, which is a number of steps of the drive unit per a unit distance of movement of the image reader by the drive unit, is stored in the memory, the drive unit is configured to drive the stepping motor at a movement resolution corresponding to the movement information with a predetermined number of driving steps per one interrupt by interrupt processing that is to be executed whenever the image reader reads a predetermined number of lines, to move the image reader, the range width calculation process includes:
    a first calculation process of calculating the detection error of the reference position, based on a reading resolution that is a resolution of the reading according to the second reading process;
    a second calculation process of calculating a value indicating a movement error of the image reader by the drive unit, based on the predetermined number of driving steps per one interrupt and the movement resolution corresponding to the movement information applied to the movement of the image reader by the drive unit; and
    a third calculation process of calculating, as the width of the predetermined range, a sum of the value indicating the detection error of the reference position calculated according to the first calculation process and the value indicating the movement error of the image reader calculated according to the second calculation process, and the reading position setting process sets the reading position of the image reader in the sub-scanning direction to a first position which falls within the range settable as the reading position, the first position being spaced from the detection position stored in the memory by the width or more calculated according to the range width calculation process in the sub-scanning direction.

4. The image reading apparatus according to claim 1, wherein the range width calculation process calculates the width of the predetermined range by using a preset value depending on a width of a factor causing an abnormal image.

5. The image reading apparatus according to claim 1, wherein when the detection position stored in the memory includes a first position and a second position different from the first position, the reading position setting process excludes a position between the first position and the second position from the reading position of the image reader if a distance between the first position and the second position in the sub-scanning direction is equal to or less than a predetermined distance.

6. The image reading apparatus according to claim 1, wherein for each data in which the abnormality is detected, the position storage process stores, in the memory, a position of the image reader, at which the corresponding data is read, in the sub-scanning direction and a position of the image reader, at which the corresponding data is read, in a main-scanning direction perpendicular to the sub-scanning direction, and when the detection position stored in the memory includes a first position indicated by one of the data for which the abnormality is detected, and a second position, which is different from the first position and is indicated by data different from the one of the data, the reading position setting process excludes a position between the first position and the second position from the reading position of the image reader if a distance between the first position and the second position in the sub-scanning direction is equal to or less than a predetermined distance and a distance between the first position and the second position in the main-scanning direction is equal to or less than a predetermined distance.

7. The image reading apparatus according to claim 1, wherein the controller is configured to execute:
    a first selection process of randomly selecting a position, which is a candidate for the reading position of the image reader in the sub-scanning direction, within the range settable as reading position; and
    a first determination process of determining whether the position selected as the candidate for the reading position according to the first selection process is a position spaced from the detection position stored in the memory by the predetermined range or more;

when it is determined in the first determination process that the position selected according to the first selection process is the position spaced by the predetermined range or more, the reading position setting process sets the position randomly selected by the first selection process to the reading position of the image reader in the sub-scanning direction; and when it is determined in the first determination process that the position selected according to the first selection process is not the position spaced by the predetermined range or more, the first selection process again randomly selects a new position of the candidate for the reading position and the first determination process determines whether the new position is the position spaced by the predetermined range or more.

8. The image reading apparatus according to claim 7, wherein when the detection position stored in the memory includes a first position and a second position different from the first position, the first determination process determines whether the position selected as the candidate for the reading position according to the first selection process is a position that is spaced from the first position by a predetermined range or more towards an opposite side to the second position in the sub-scanning direction and is spaced from the second position by the predetermined range or more towards an opposite side to the first position in the sub-scanning direction, if a position between the first position and the second position in the sub-scanning direction is equal to or less than a predetermined distance.

9. The image reading apparatus according to claim 7, wherein
the controller is configured to execute:
a counting process of counting a number of times that the first selection process selects the position of the candidate for the reading position;
a second selection process of randomly selecting a position of the candidate for the reading position of the image reader in the sub-scanning direction within the range settable as the reading position when the number of times counted according to the counting process reaches a predetermined number of times; and
a third determination process of determining whether the position selected as the candidate for the reading position according to the second selection process coincides with the detection position stored in the memory,
the reading position setting process sets the position selected according to the second selection process to the reading position of the image reader in the sub-scanning direction when it is determined in the third determination process that the position selected according to the second selection process does not coincide with the detection position stored in the memory, and
the second selection process again randomly selects a new position of the candidate for the reading position and the third determination process determines whether the new position selected according to the second selection process coincides with the detection position stored in the memory when it is determined in the third termination process that the position selected by the second selection process coincides with the detection position stored in the memory.

10. The image reading apparatus according to claim 7, wherein
the image reader is configured to read the document line-by-line in a main-scanning direction perpendicular to the sub-scanning direction,
the drive unit includes a stepping motor configured to move the image reader,
movement information defining a movement resolution, which is a number of steps of the drive unit per a unit distance of movement of the image reader by the drive unit, is stored in the memory,
the drive unit is configured to drive the stepping motor at a movement resolution corresponding to the movement information with a predetermined number of driving steps per one interrupt by interrupt processing that is to be executed whenever the image reader reads a predetermined number of lines, to move the image reader, and
the controller is configured to execute:
a counting process of counting a number of times that the first selection process selects the position of the candidate for the reading position;
a fourth determination process of, when the number of times counted by the counting process reaches a predetermined number of times with respect to the movement information being applied to the movement of the image reader according to the movement process, determining whether the movement information, which indicates a higher movement resolution than the movement resolution corresponding to the movement information being applied to the movement of the image reader according to the movement process, is stored in the memory; and
a second change process of, when it is determined in the fourth determination process that the movement information, which indicates the higher movement resolution than the movement resolution corresponding to the movement information being applied to the movement of the image reader by the drive unit, is stored in the memory, changing the movement information to be applied to the movement of the image reader by the drive unit to the movement information, which is stored in the memory and indicates the higher movement resolution than the movement information being applied to the movement of the image reader by the drive unit.

11. The image reading apparatus according to claim 1, wherein
the image reader is configured to read the document line-by-line in a main-scanning direction perpendicular to the sub-scanning direction,
the drive unit includes a stepping motor configured to move the image reader,
movement information defining a movement resolution, which is a resolution of movement of the image reader by the drive unit, is stored in the memory,
the drive unit is configured to drive the stepping motor at a movement resolution corresponding to the movement information with a predetermined number of driving steps per one interrupt by interrupt processing that is to be executed whenever the image reader reads a predetermined number of lines, to move the image reader, and
the reading position setting process sets the reading position of the image reader in the sub-scanning direction to a position that falls within the range settable as the reading position and is spaced from the position stored in the memory by a sum of a width of the predetermined range and a moving amount of the image reader by the drive unit according to the movement process in accordance with the number of driving steps per one interrupt.

12. The image reading apparatus according to claim 11, wherein
the controller is configured to execute a position acquisition process of acquiring a position, which is most spaced from one end of the range settable as the reading position in the sub-scanning direction, of the positions stored in the memory, and
the reading position setting process sets the reading position of the image reader in the sub-scanning direction to a position that falls within the range settable as the reading position and is spaced from the position acquired by the position acquisition process towards a side spaced from one end in the sub-scanning direction by a sum of a width of the predetermined range and a moving amount of the image reader by the drive unit according to the number of driving steps per one interrupt.

13. The image reading apparatus according to claim 1, wherein in a case that there are a plurality of data for which the abnormality is detected, the position storage process excludes a position of specific data in which a position of the specific data in the sub-scanning direction is different from that of the other data, and a position of the specific data in the a main-scanning direction perpendicular to the sub-scanning direction coincides to that of the other data, and does not store the specific data in the memory.

14. An image reading apparatus comprising:
a document feeder configured to feed a document in a feeding direction;
a platen;
an image reader configured to read the document fed by the document feeder over the platen;
a drive unit configured to move the image reader in a sub-scanning direction parallel to the feeding direction;
a memory, and
a controller,
wherein the controller is configured to execute:
a determination process of reading a reference plate at a predetermined reading position by the image reader to obtain read data, and determining whether a pixel value of the read data exceeds a threshold;
a position storage process of, when it is determined in the first determination process that the pixel value of the read data does not exceed the threshold, storing, in the memory, a position of the image reader in the sub-scanning direction where the image reader obtains the read data;
a reading position setting process of setting a reading position of the image reader in the sub-scanning direction to a set position spaced by a predetermined range or more from the position stored in the memory, the set position being located within a range settable as the reading position;
an instruction receiving process of receiving an instruction to start document reading;
a movement process of, when the instruction is received according to the instruction receiving process, moving the image reader under standby at a standby position by the drive unit to the set position set according to the reading position setting process;
a first reading process of reading the document, fed by the document feeder, by the image reader;
a second reading process of reading a reference, a position of a portion of the reference being a reference position, with respect to the standby position by the image reader while the image reader is moved according to the movement process in a direction facing towards the reference position;
a second detection process of detecting the reference position based on data obtained by the image reader according to the second reading process;
a movement stopping process of stopping the drive unit moving the image reader at the standby position after the reference position is detected according to the second detection process; and
a range width calculation process of calculating a width of the predetermined range in accordance with a value indicating a detection error of the reference position according to the second detection process.

15. The image reading apparatus according to claim 14, wherein the controller is configured to execute the range width calculation process of calculating the width of the predetermined range in accordance with a value indicating a movement error of the image reader moved by the drive unit.

16. The image reading apparatus according to claim 14, wherein
the controller is configured to execute:
a first selection process of randomly selecting a position, which is a candidate for the reading position of the image reader in the sub-scanning direction, within the range settable as reading position; and a first determination process of determining whether the position selected as the candidate for the reading position according to the first selection process is a position spaced from the detection position stored in the memory by the predetermined range or more;
when it is determined in the first determination process that the position selected according to the first selection process is the position spaced by the predetermined range or more, the reading position setting process sets the position randomly selected by the first selection process to the reading position of the image reader in the sub-scanning direction; and
when it is determined in the first determination process that the position selected according to the first selection process is not the position spaced by the predetermined range or more, the first selection process again randomly selects a new position of the candidate for the reading position and the first determination process determines whether the new position is the position spaced by the predetermined range or more.

17. An image reading apparatus comprising:
a document feeder configured to feed a document in a feeding direction;
a platen;
an image reader configured to read the document, fed by the document feeder, over the platen;
a drive unit configured to move the image reader in a sub-scanning direction parallel to the feeding direction;
a memory; and
a controller,
wherein the controller is configured to execute:
a first detection process of causing the image reader to read a reference plate at a predetermined reading position to generate read data, and detecting whether the read data has an abnormality;
a position storage process of, when it is detected in the first detecting process that the read data has the abnormality, storing, in the memory, a detection position where the image reader reads the read data in the sub-scanning direction;
a reading position setting process of setting a reading position of the image reader in the sub-scanning direction to a set position spaced by a predetermined range or more from the detection position stored in the memory, the set position being located within a range settable as the reading position;
an instruction receiving process of receiving an instruction to start document reading;
a movement process of, when the instruction is received in the instruction receiving process, moving, by the drive unit, the image reader under standby at a standby position to the set position set according to the reading position setting process;
a first reading process of reading the document, fed by the document feeder, by the image reader,
a first selection process of randomly selecting a position, which is a candidate for the reading position of the image reader in the sub-scanning direction, within the range settable as reading position; and
a first determination process of determining whether the position selected as the candidate for the reading position according to the first selection process is a position spaced from the detection position stored in the memory by the predetermined range or more;
when it is determined in the first determination process that the position selected according to the first selection process is the position spaced by the predetermined range or more, the reading position setting process sets the position randomly selected by the first selection process to the reading position of the image reader in the sub-scanning direction; and when it is determined in the first determination process that the position selected according to the first selection process is not the position spaced by the predetermined range or more, the first selection process again randomly selects a new position of the candidate for the reading position and the first determination process determines whether the new position is the position spaced by the predetermined range or more.

18. The image reading apparatus according to claim 17, wherein
when the detection position stored in the memory includes a first position and a second position different from the first position, the first determination process determines whether the position selected as the candidate for the reading position according to the first selection process is a position that is spaced from the first position by a predetermined range or more towards an opposite side to the second position in the sub-scanning direction and is spaced from the second position by the predetermined range or more towards an opposite side to the first position in the sub-scanning direction, if a position between the first position and the second position in the sub-scanning direction is equal to or less than a predetermined distance.

19. The image reading apparatus according to claim 17, wherein
the controller is configured to execute:
a counting process of counting a number of times that the first selection process selects the position of the candidate for the reading position;
a second selection process of randomly selecting a position of the candidate for the reading position of the image reader in the sub-scanning direction within the range settable as the reading position when the number of times counted according to the counting process reaches a predetermined number of times; and
a third determination process of determining whether the position selected as the candidate for the reading position according to the second selection process coincides with the detection position stored in the memory,
the reading position setting process sets the position selected according to the second selection process to the reading position of the image reader in the sub-scanning direction when it is determined in the third determination process that the position selected according to the second selection process does not coincide with the detection position stored in the memory, and
the second selection process again randomly selects a new position of the candidate for the reading position and the third determination process determines whether the new position selected according to the second selection process coincides with the detection position stored in the memory when it is determined in the third determination process that the position selected by the second selection process coincides with the detection position stored in the memory.

20. The image reading apparatus according to claim 17, wherein
the image reader is configured to read the document line-by-line in a main-scanning direction perpendicular to the sub-scanning direction,
the drive unit includes a stepping motor configured to move the image reader,
movement information defining a movement resolution, which is a number of steps of the drive unit per a unit distance of movement of the image reader by the drive unit, is stored in the memory,
the drive unit is configured to drive the stepping motor at a movement resolution corresponding to the movement information with a predetermined number of driving steps per one interrupt by interrupt processing that is to be executed whenever the image reader reads a predetermined number of lines, to move the image reader, and
the controller is configured to execute:
a counting process of counting a number of times that the first selection process selects the position of the candidate for the reading position;
a fourth determination process of, when the number of times counted by the counting process reaches a predetermined number of times with respect to the movement information being applied to the movement of the image reader according to the movement process, determining whether the movement information, which indicates a higher movement resolution than the movement resolution corresponding to the movement information being applied to the movement of the image reader according to the movement process, is stored in the memory; and
a second change process of, when it is determined in the fourth determination process that the movement information, which indicates the higher movement resolution than the movement resolution corresponding to the movement information being applied to the movement of the image reader by the drive unit, is stored in the memory, changing the movement information to be applied to the movement of the image reader by the drive unit to the movement information, which is stored in the memory and indicates the higher movement resolution than the movement information being applied to the movement of the image reader by the drive unit.

* * * * *

UNITED STATES PATENT AND TRADEMARK OFFICE
CERTIFICATE OF CORRECTION

PATENT NO. : 9,591,162 B2  
APPLICATION NO. : 14/865116  
DATED : March 7, 2017  
INVENTOR(S) : Shinya Sahara It is certified that error appears in the above-identified patent and that said Letters Patent is hereby corrected as shown below:

In the Claims

Column 28, Claim 13, Line 66 it should read: a main-scanning direction perpendicular to the sub- Signed and Sealed this  
Nineteenth Day of September, 2017

Joseph Matal  
*Performing the Functions and Duties of the*  
*Under Secretary of Commerce for Intellectual Property and*  
*Director of the United States Patent and Trademark Office*